(12) United States Patent
Bernstein et al.

(10) Patent No.: US 9,114,838 B2
(45) Date of Patent: Aug. 25, 2015

(54) SELF-PROPELLED DEVICE FOR INTERPRETING INPUT FROM A CONTROLLER DEVICE

(75) Inventors: Ian H. Bernstein, Boulder, CO (US); Adam Wilson, Longmont, CO (US); Brian Keith Smith, Boulder, CO (US); Jonathan Carroll, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 142 days.

(21) Appl. No.: 13/342,908

(22) Filed: Jan. 3, 2012

(65) Prior Publication Data

US 2012/0168241 A1    Jul. 5, 2012

Related U.S. Application Data

(60) Provisional application No. 61/430,023, filed on Jan. 5, 2011, provisional application No. 61/430,083, filed on Jan. 5, 2011, provisional application No. 61/553,923, filed on Oct. 31, 2011.

(51) Int. Cl.
| | |
|---|---|
| G05B 15/00 | (2006.01) |
| B62D 61/00 | (2006.01) |
| A63H 30/04 | (2006.01) |
| A63H 33/00 | (2006.01) |
| G05D 1/00 | (2006.01) |
| G05D 1/02 | (2006.01) |

(52) U.S. Cl.
CPC .............. *B62D 61/00* (2013.01); *A63H 30/04* (2013.01); *A63H 33/005* (2013.01); *G05D 1/0016* (2013.01); *G05D 1/0044* (2013.01); *G05D 1/027* (2013.01); *G05D 1/0278* (2013.01); *G05D 1/0259* (2013.01); *G05D 2201/0214* (2013.01); *Y10S 901/01* (2013.01)

(58) Field of Classification Search
CPC ........... G09G 5/08; G05B 15/02; A63H 17/00
USPC ................ 700/264; 472/4, 446; 701/1–2, 18, 701/56–58, 61
See application file for complete search history.

(56) References Cited

U.S. PATENT DOCUMENTS

| | | | |
|---|---|---|---|
| 3,683,216 A | 8/1972 | Post | |
| 4,996,468 A | 2/1991 | Field et al. | |
| 5,297,981 A | 3/1994 | Maxim et al. | |
| 6,227,933 B1 | 5/2001 | Michaud et al. | |
| 6,246,927 B1 | 6/2001 | Dratman | |
| 6,458,008 B1 * | 10/2002 | Hyneman | 446/259 |
| 6,459,955 B1 * | 10/2002 | Bartsch et al. | 700/245 |

(Continued)

FOREIGN PATENT DOCUMENTS

| | | |
|---|---|---|
| DE | 101 46 862 A1 | 5/2002 |
| JP | 03182290 A | 8/1991 |

(Continued)

OTHER PUBLICATIONS

Provisional U.S. Appl. No. 61/362,005, Schmelzer, filed Jul. 7, 2010.*

(Continued)

*Primary Examiner* — Calvin Cheung
(74) *Attorney, Agent, or Firm* — Mahamedi Paradice LLP

(57) ABSTRACT

A self-propelled device operates to interpret an input corresponding to a set of actions that are performed on a controller device.

22 Claims, 21 Drawing Sheets

(56) References Cited

U.S. PATENT DOCUMENTS

| | | | |
|---|---|---|---|
| 6,573,883 B1* | 6/2003 | Bartlett | 345/156 |
| 6,615,109 B1 | 9/2003 | Matsuoka et al. | |
| 6,764,373 B1 | 7/2004 | Osawa et al. | |
| 6,785,590 B2 | 8/2004 | Kasuga et al. | |
| 6,945,843 B1 | 9/2005 | Motosko | |
| 6,980,956 B1 | 12/2005 | Takagi et al. | |
| 7,069,113 B2 | 6/2006 | Matsuoka et al. | |
| 7,130,741 B2 | 10/2006 | Bodin et al. | |
| 7,170,047 B2 | 1/2007 | Pal | |
| 7,173,604 B2* | 2/2007 | Marvit et al. | 345/156 |
| 7,258,591 B2 | 8/2007 | Xu et al. | |
| 7,340,077 B2 | 3/2008 | Gokturk et al. | |
| 7,344,430 B2 | 3/2008 | Hasty et al. | |
| 7,432,718 B2 | 10/2008 | Ishihara et al. | |
| 7,526,362 B2 | 4/2009 | Kim et al. | |
| 7,714,880 B2* | 5/2010 | Johnson | 345/672 |
| 7,822,507 B2 | 10/2010 | Ishihara et al. | |
| 7,847,504 B2* | 12/2010 | Hollis | 318/568.12 |
| 7,853,357 B2 | 12/2010 | Sawada et al. | |
| 7,979,162 B2 | 7/2011 | Niemela et al. | |
| 8,025,551 B2* | 9/2011 | Torres et al. | 446/431 |
| 8,038,504 B1 | 10/2011 | Wong | |
| 8,099,189 B2* | 1/2012 | Kaznov et al. | 700/245 |
| 8,128,450 B2 | 3/2012 | Imai | |
| 8,128,500 B1 | 3/2012 | Borst et al. | |
| 8,142,287 B2 | 3/2012 | Podoloff | |
| 8,180,436 B2 | 5/2012 | Boyden et al. | |
| 8,197,298 B2* | 6/2012 | Willett | 446/164 |
| 8,258,917 B2* | 9/2012 | Cai et al. | 340/4.13 |
| 8,274,406 B2 | 9/2012 | Karlsson et al. | |
| 8,275,544 B1 | 9/2012 | Wells et al. | |
| 8,326,469 B2 | 12/2012 | Phillips et al. | |
| 8,352,643 B2 | 1/2013 | Birnbaum et al. | |
| 8,355,818 B2 | 1/2013 | Nielsen et al. | |
| 8,364,136 B2 | 1/2013 | Hoffberg et al. | |
| 8,392,065 B2 | 3/2013 | Tolstedt et al. | |
| 8,396,611 B2 | 3/2013 | Phillips et al. | |
| 8,417,384 B2 | 4/2013 | Togawa et al. | |
| 8,456,298 B2* | 6/2013 | Valtonen | 340/539.13 |
| 8,571,781 B2 | 10/2013 | Bernstein et al. | |
| 8,577,595 B2 | 11/2013 | Zhao et al. | |
| 8,670,889 B2* | 3/2014 | Kaznov | 701/23 |
| 2003/0093182 A1 | 5/2003 | Yokoyama | |
| 2004/0002843 A1 | 1/2004 | Robarts et al. | |
| 2004/0182614 A1 | 9/2004 | Wakui | |
| 2004/0186623 A1 | 9/2004 | Dooley et al. | |
| 2005/0186884 A1 | 8/2005 | Evans | |
| 2005/0226192 A1 | 10/2005 | Red et al. | |
| 2005/0264472 A1 | 12/2005 | Rast | |
| 2006/0095158 A1 | 5/2006 | Lee et al. | |
| 2006/0101465 A1 | 5/2006 | Kato et al. | |
| 2006/0271251 A1 | 11/2006 | Hopkins | |
| 2007/0112462 A1 | 5/2007 | Kim et al. | |
| 2007/0249422 A1* | 10/2007 | Podoloff | 463/43 |
| 2007/0259592 A1 | 11/2007 | Imai et al. | |
| 2008/0033641 A1 | 2/2008 | Medalia | |
| 2008/0121097 A1 | 5/2008 | Rudakevych et al. | |
| 2008/0240507 A1 | 10/2008 | Niwa et al. | |
| 2008/0263628 A1 | 10/2008 | Norman et al. | |
| 2008/0267450 A1 | 10/2008 | Sugimoto et al. | |
| 2008/0269949 A1 | 10/2008 | Norman et al. | |
| 2009/0055019 A1* | 2/2009 | Stiehl et al. | 700/249 |
| 2009/0057238 A1 | 3/2009 | Garti | |
| 2009/0081923 A1* | 3/2009 | Dooley et al. | 446/456 |
| 2009/0171516 A1 | 7/2009 | Reich | |
| 2009/0204261 A1 | 8/2009 | Strand et al. | |
| 2009/0226035 A1 | 9/2009 | Iihoshi et al. | |
| 2009/0262074 A1* | 10/2009 | Nasiri et al. | 345/158 |
| 2009/0265671 A1* | 10/2009 | Sachs et al. | 715/863 |
| 2009/0284553 A1 | 11/2009 | Seydoux | |
| 2010/0004798 A1 | 1/2010 | Bodin et al. | |
| 2010/0010669 A1 | 1/2010 | Lee et al. | |
| 2010/0032224 A1 | 2/2010 | Liu | |
| 2010/0063652 A1 | 3/2010 | Anderson | |
| 2010/0066676 A1 | 3/2010 | Kramer et al. | |
| 2010/0106344 A1 | 4/2010 | Edwards et al. | |
| 2010/0145236 A1 | 6/2010 | Greenberg et al. | |
| 2010/0169098 A1 | 7/2010 | Patch | |
| 2010/0172287 A1 | 7/2010 | Krieter | |
| 2010/0183195 A1 | 7/2010 | Sharma | |
| 2010/0234993 A1 | 9/2010 | Seelinger et al. | |
| 2010/0241289 A1 | 9/2010 | Sandberg | |
| 2010/0261526 A1 | 10/2010 | Anderson et al. | |
| 2010/0305778 A1* | 12/2010 | Dorneich et al. | 701/2 |
| 2010/0305781 A1 | 12/2010 | Felix | |
| 2010/0324753 A1 | 12/2010 | Okumatsu | |
| 2011/0003640 A9 | 1/2011 | Ehrman | |
| 2011/0018731 A1* | 1/2011 | Linsky et al. | 340/825.36 |
| 2011/0018794 A1* | 1/2011 | Linsky et al. | 345/156 |
| 2011/0022196 A1* | 1/2011 | Linsky et al. | 700/85 |
| 2011/0050940 A1 | 3/2011 | Lanz et al. | |
| 2011/0060492 A1 | 3/2011 | Kaznov | |
| 2011/0065488 A1 | 3/2011 | Okamura et al. | |
| 2011/0071652 A1 | 3/2011 | Brown et al. | |
| 2011/0071702 A1 | 3/2011 | Wang et al. | |
| 2011/0082566 A1 | 4/2011 | Herr et al. | |
| 2011/0087371 A1 | 4/2011 | Sandberg et al. | |
| 2011/0184590 A1 | 7/2011 | Duggan et al. | |
| 2011/0213278 A1 | 9/2011 | Horak et al. | |
| 2011/0234488 A1 | 9/2011 | Ge et al. | |
| 2011/0250967 A1 | 10/2011 | Kulas | |
| 2011/0291926 A1 | 12/2011 | Gokturk et al. | |
| 2011/0313568 A1 | 12/2011 | Blackwell et al. | |
| 2011/0320830 A1* | 12/2011 | Ito | 713/300 |
| 2012/0009845 A1* | 1/2012 | Schmelzer | 446/431 |
| 2012/0035799 A1* | 2/2012 | Ehrmann | 701/28 |
| 2012/0065747 A1* | 3/2012 | Brown et al. | 700/56 |
| 2012/0083945 A1 | 4/2012 | Oakley et al. | |
| 2012/0106783 A1 | 5/2012 | Chang et al. | |
| 2012/0146775 A1 | 6/2012 | Kudo et al. | |
| 2012/0167014 A1 | 6/2012 | Joo et al. | |
| 2012/0173018 A1 | 7/2012 | Allen et al. | |
| 2012/0173047 A1 | 7/2012 | Bernstein et al. | |
| 2012/0173049 A1 | 7/2012 | Bernstein et al. | |
| 2012/0185115 A1 | 7/2012 | Dean | |
| 2012/0193154 A1 | 8/2012 | Wellborn et al. | |
| 2012/0197439 A1 | 8/2012 | Wang et al. | |
| 2012/0215355 A1 | 8/2012 | Bewley et al. | |
| 2012/0244969 A1* | 9/2012 | Binder | 473/570 |
| 2012/0291926 A1 | 11/2012 | Misra et al. | |
| 2012/0298049 A1 | 11/2012 | Cook et al. | |
| 2012/0298430 A1 | 11/2012 | Schroll et al. | |
| 2012/0307001 A1 | 12/2012 | Osako et al. | |
| 2012/0311810 A1 | 12/2012 | Gilbert et al. | |
| 2013/0050069 A1 | 2/2013 | Ota | |
| 2013/0065482 A1* | 3/2013 | Trickett | 446/397 |
| 2013/0109272 A1* | 5/2013 | Rindlisbacher | 446/454 |
| 2013/0143482 A1* | 6/2013 | Regler | 455/3.06 |
| 2013/0265225 A1* | 10/2013 | Nasiri et al. | 345/156 |

FOREIGN PATENT DOCUMENTS

| | | |
|---|---|---|
| JP | 09254838 A | 9/1997 |
| JP | 2000218578 A | 8/2000 |
| KR | 10-2009-0000013 A | 1/2009 |
| KR | 10-0969873 B1 | 7/2010 |
| WO | WO-97/25239 A1 | 7/1991 |
| WO | WO-2006/049559 A1 | 5/2006 |
| WO | WO-2012/094349 A2 | 7/2012 |

OTHER PUBLICATIONS

Non-Final Office Action mailed Oct. 16, 2012, for related U.S. Appl. No. 13/342,853, filed Feb. 19, 2013, 10 pages.

Non-Final Office Action mailed Apr. 9, 2013, for related U.S. Appl. No. 13/342,892, filed Jan. 3, 2013, 19 pages.

Notification of Transmittal of International Search Report and the Written Opinion of the International Searching Authority mailed Dec. 3, 2012, for related PCT Application No. PCT/US2012/020115 filed Jan. 3, 2012, 11 pages.

Non-Final Office Action mailed Apr. 16, 2013, for related U.S. Appl. No. 13/342,884, filed Jan. 3, 2013, 20 pages.

Notice of Allowance mailed Apr. 19, 2013, for related U.S. Appl. No. 13/342,853, filed Feb. 19, 2013, 11 pages.

(56) References Cited

OTHER PUBLICATIONS

Non-Final Office Action mailed May 13, 2013, for related U.S. Appl. No. 13/342,874, filed Jan. 3, 2012, 17 pages.
Non-Final Office Action mailed Jun. 3, 2013, for related U.S. Appl. No. 13/342,914, filed Jan. 3, 2012, 32 pages.
Koshiyama et al., Machine Translation for JP 2000-218578, Aug. 8, 2000, 11 Pages.
GearBox Ball Prototype Jun. 29, 2010, Pictures from Video [online]. Orbotix, Inc., Jun. 30, 2010, 91 pages. Retrieved from the internet<URL: http://www.youtube.com/watch?v=qRBM7bAaXpU>.
Notification of Transmittal of International Search Report and the Written Opinion of the International Searching Authority mailed Aug. 28, 2013, for related PCT Application No. PCT/US2013/041023 filed May 14, 2013, 11 pages.
Final Office Action mailed Nov. 15, 2013, for related U.S. Appl. No. 13/342,892, filed Jan. 3, 2013, 21 pages.
Final Office Action mailed Nov. 18, 2013, for related U.S. Appl. No. 13/342,884, filed Jan. 3, 2013, 19 pages.
Final Office Action mailed Nov. 18, 2013, for related U.S. Appl. No. 13/342,874, filed Jan. 3, 2012, 21 pages.
Final Office Action mailed Nov. 13, 2013, for related U.S. Appl. No. 13/342,914, filed Jan. 3, 2013, 30 pages.
Liu, Dalian et al., "Motion Control of a Spherical Mobile Robot by Feedback Linearization," 7th WC on IC&A, Jun. 27, 2008, Chongqing, China, pp. 965-970. 6 pages.
Shu, Guanghui et al., "Motion Control of Spherical Robot Based on Conservation of Angular Momentum," IEEE Intl Conf on Mechatronics & Automation, Aug. 12, Changchun, China, pp. 599-604. 6 pages.
Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.
Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.
Halme, Aarne, et al., "Motion Control of a Spherical Mobile Robot", Helsinki, IEEE AMC '1996, pp. 259-264. 6 pages.
Non-Final Office Action mailed Apr. 29, 2013, for related U.S. Appl. No. 13/342,874, filed Jan. 3, 2012, 47 pages.
European Search Report and European Search Opinion mailed Nov. 6, 2014, for related EP Application No. 12731945.7 filed Jul. 26, 2013. 7 pages.
International Search Report and the Written Opinion mailed Dec. 17, 2014, for Application No. PCT/US2014/059973 filed Sep. 10, 2014, 13 pages.

\* cited by examiner

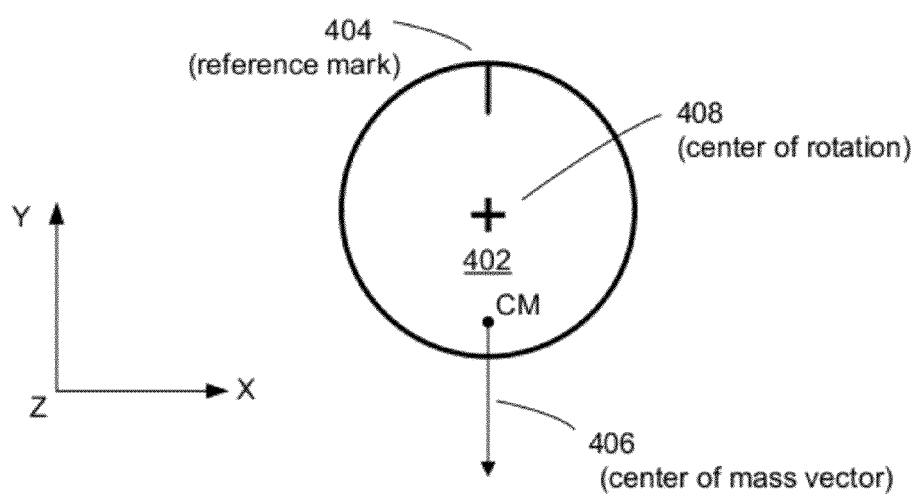
FIG. 4A
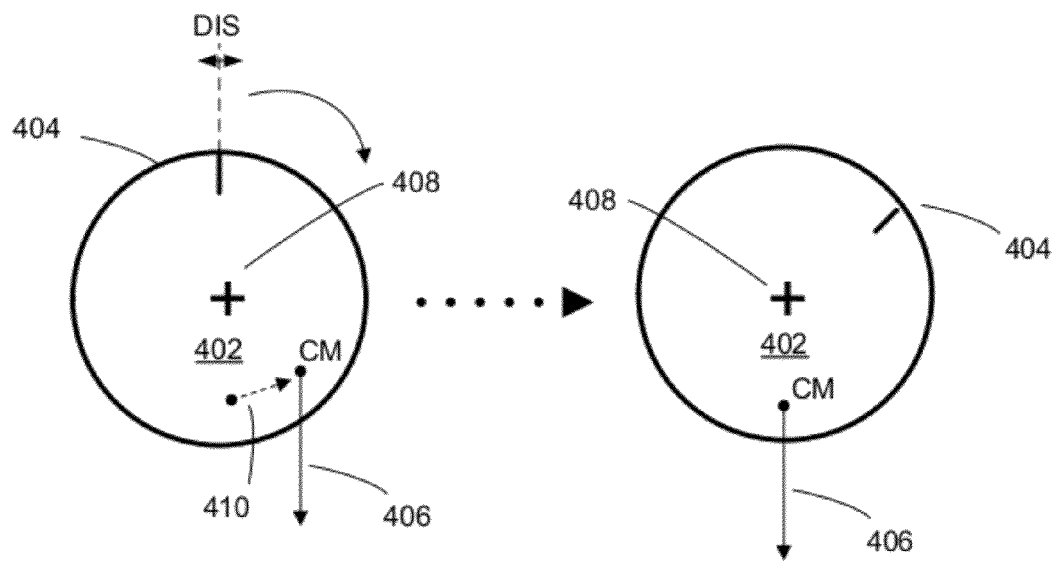
FIG. 4B
FIG. 4C

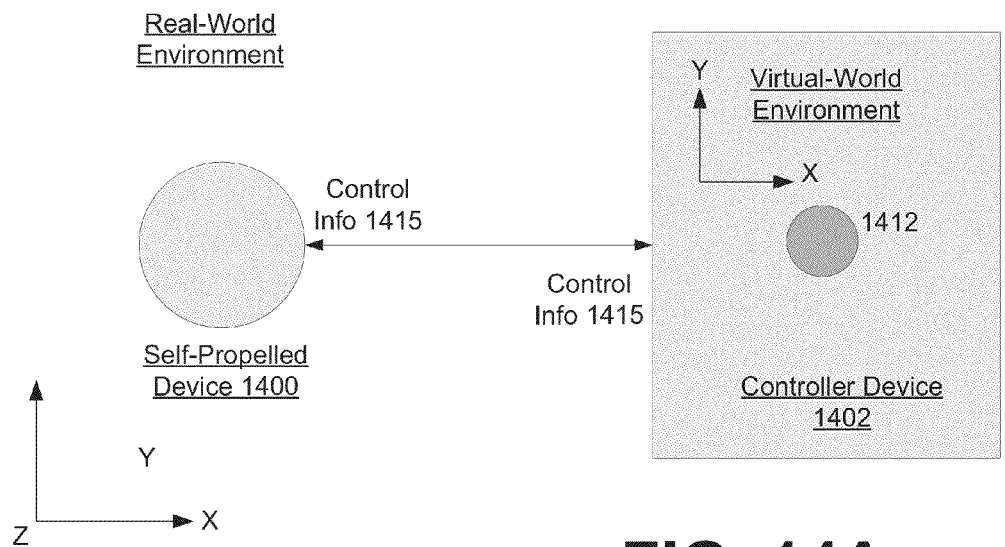
FIG. 14A
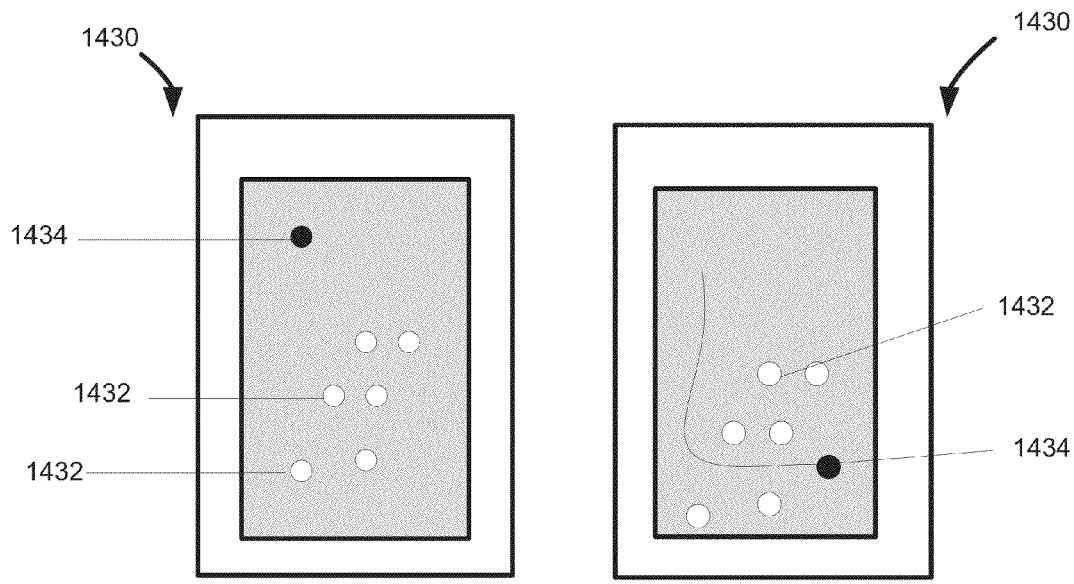
FIG. 14B
FIG. 14C

SELF-PROPELLED DEVICE FOR INTERPRETING INPUT FROM A CONTROLLER DEVICE

RELATED APPLICATIONS

This application claims priority to (i) U.S. Provisional Patent Application Ser. No. 61/430,023, entitled "Method and System for Controlling a Robotic Device," filed Jan. 5, 2011; (ii) U.S. Provisional Patent Application Ser. No. 61/430,083, entitled "Method and System for Establishing 2-Way Communication for Controlling a Robotic Device," filed Jan. 5, 2011; and (iii) U.S. Provisional Patent Application Ser. No. 61/553,923, entitled "A Self-propelled Device and System and Method for Controlling Same," filed Oct. 31, 2011; all of the aforementioned priority applications are hereby incorporated by reference in their respective entirety.

FIELD OF THE INVENTION

Embodiments described herein generally relate to a self-propelled device, and more specifically, to a self-propelled device for interpreting input from a controller device.

BACKGROUND

Early in human history, the wheel was discovered and human fascination with circular and spherical objects began. Humans were intrigued by devices based on these shapes: as practical transportation and propulsion, and as toys and amusements. Self-propelled spherical objects were initially powered by inertia or mechanical energy storage in devices such as coiled springs. As technology has evolved, new ways of applying and controlling these devices have been invented. Today, technology is available from robotics, high energy-density battery systems, sophisticated wireless communication links, micro sensors for magnetism, orientation and acceleration, and widely available communication devices with displays and multiple sensors for input.

BRIEF DESCRIPTION OF THE DRAWINGS

FIGS. 4A, 4B, and 4C illustrate a technique for causing controlled movement of a spherical self-propelled device, in accordance with one or more embodiments.

FIG. 14A illustrates a system in which a self-propelled device is represented in a virtual environment while the self-propelled device operates in a real-world environment, under an embodiment.

FIG. 14B and FIG. 14C illustrate an application in which a self-propelled device acts as a fiducial marker, according to an embodiment.

DETAILED DESCRIPTION

Figure 1:
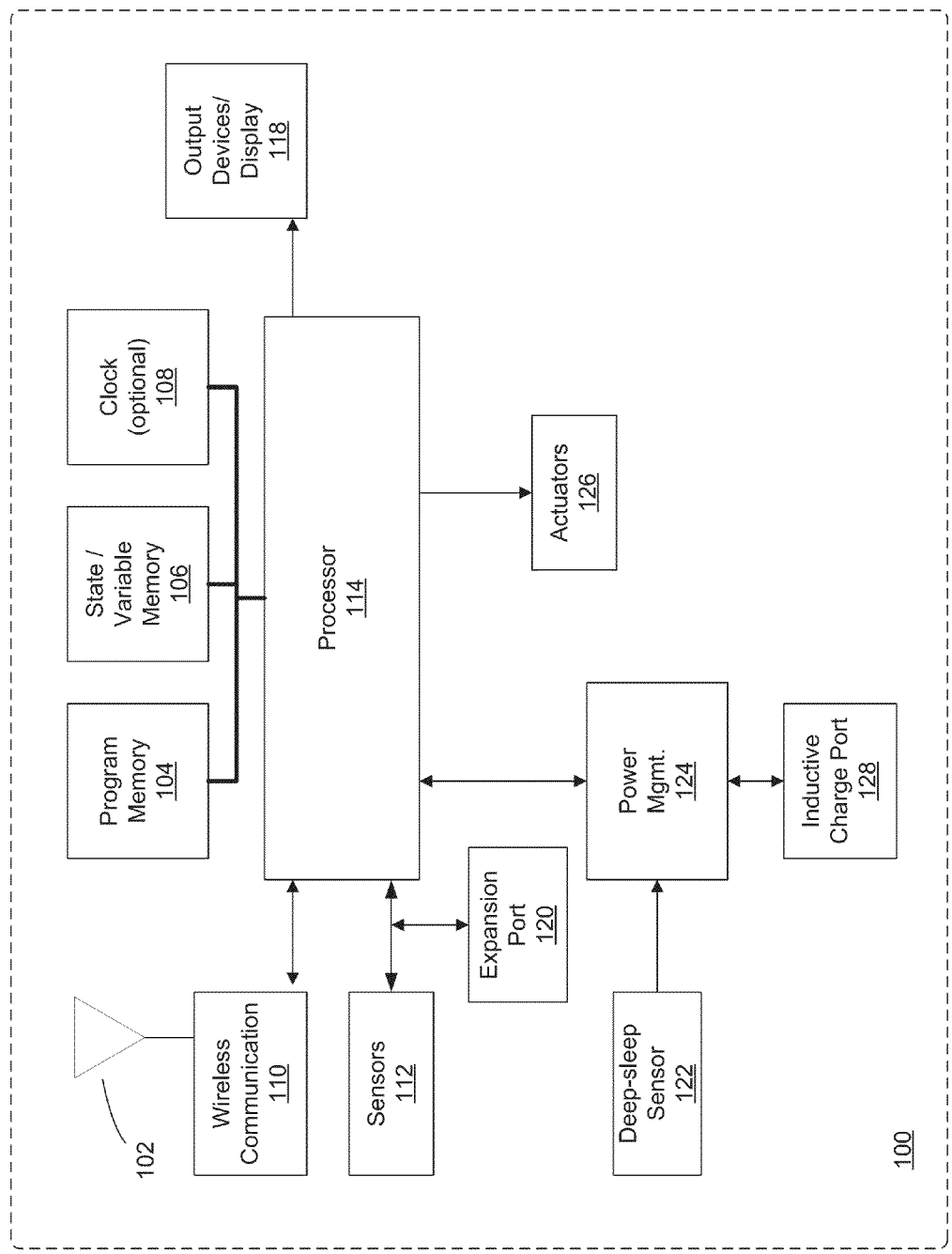
FIG. 1 is a schematic depiction of a self-propelled device, according to one or more embodiments.

In an embodiment, a self-propelled device is provided, which includes a drive system, a spherical housing, and a biasing mechanism. The drive system includes one or more motors that are contained within the spherical housing. The biasing mechanism actively forces the drive system to continuously engage an interior of the spherical housing in order to cause the spherical housing to move.

According to another embodiment, a self-controlled device maintains a frame of reference about an X-, Y- and Z-axis. The self-controlled device processes an input to control the self-propelled device, the input being based on the X- and Y-axis. The self-propelled device is controlled in its movement, including about each of the X-, Y- and Z-axes, based on the input.

Still further, another embodiment provides a system that includes a controller device and a self-propelled device. The self-propelled device is operable to move under control of the controller device, and maintains a frame of reference about an X-, Y- and Z-axis. The controller device provides an interface to enable a user to enter two-dimensional control input about the X- and Y-axes. The self-propelled device processes the control input from the controller device in order to maintain control relative to the X-, Y- and Z-axes.

According to another embodiment, a self-propelled device determines an orientation for its movement based on a predetermined reference frame. A controller device is operable by a user to control the self-propelled device. The controller device includes a user interface for controlling at least a direction of movement of the self-propelled device. The self-propelled device is configured to signal the controller device information that indicates the orientation of the self-propelled device. The controller device is configured to orient the user interface, based on the information signaled from the self-propelled device, to reflect the orientation of the self-propelled device.

According to another embodiment, a controller device is provided for a self-propelled device. The controller device includes one or more processors, a display screen, a wireless communication port and a memory. The processor operates to generate a user interface for controlling at least a directional movement of the self-propelled device, receive information from the self-propelled device over the wireless communication port indicating an orientation of the self-propelled device, and configure the user interface to reflect the orientation of the self-propelled device.

In still another embodiment, a self-propelled device includes a drive system, a wireless communication port, a memory and a processor. The memory stores a first set of instructions for mapping individual inputs from a first set of recognizable inputs to a corresponding command that controls movement of the self-propelled device. The processor (or processors) receive one or more inputs from the controller device over the wireless communication port, map each of the one or more inputs to a command based on the set of instructions, and control the drive system using the command determined for each of the one or more inputs. While the drive system is controlled, the processor processes one or more instructions to alter the set of recognizable inputs and/or the corresponding command that is mapped to the individual inputs in the set of recognizable inputs.

Still further, embodiments enable a controller device to include an object or virtual representation of the self-propelled device.

TERMS

As used herein, the term "substantially" means at least almost entirely. In quantitative terms, "substantially" means at least 80% of a stated reference (e.g., quantity of shape).

In similar regard, "spherical" or "sphere" means "substantially spherical." An object is spherical if it appears as such as to an ordinary user, recognizing that, for example, manufacturing processes may create tolerances in the shape or design where the object is slightly elliptical or not perfectly symmetrical, or that the object may include surface features or mechanisms for which the exterior is not perfectly smooth or symmetrical.

Overview

Referring now to the drawings, FIG. 1 is a schematic depiction of a self-propelled device, according to one or more embodiments. As described by various embodiments, self-propelled device 100 can be operated to move under control of another device, such as a computing device operated by a user. In some embodiments, self-propelled device 100 is configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

In an embodiment, self-propelled device 100 includes several interconnected subsystems and modules. Processor 114 executes programmatic instructions from program memory 104. The instructions stored in program memory 104 can be changed, for example to add features, correct flaws, or modify behavior. In some embodiments, program memory 104 stores programming instructions that are communicative or otherwise operable with software executing on a computing device. The processor 114 is configured to execute different programs of programming instructions, in order to after the manner in which the self-propelled device 100 interprets or otherwise responds to control input from another computing device.

Wireless communication 110, in conjunction with communication transducer 102, serves to exchange data between processor 114 and other external devices. The data exchanges, for example, provide communications, provide control, provide logical instructions, state information, and/or provide updates for program memory 104. In some embodiments, processor 114 generates output corresponding to state and/or position information, that is communicated to the controller device via the wireless communication port. The mobility of the device makes wired connections undesirable; the term "connection" should be understood to mean a logical connection made without a physical attachment to self-propelled device 100.

In one embodiment, wireless communication 110 implements the BLUETOOTH communications protocol and transducer 102 is an antenna suitable for transmission and reception of BLUETOOTH radio signals. Other wireless communication mediums and protocols may also be used in alternative implementations.

Sensors 112 provide information about the surrounding environment and condition to processor 114. In one embodiment, sensors 112 include inertial measurement devices, including a 3-axis gyroscope, a 3-axis accelerometer, and a 3-axis magnetometer. According to some embodiments, the sensors 114 provide input to enable processor 114 to maintain awareness of the device's orientation and/or position relative to the initial reference frame after the device initiates movement. In various embodiments, sensors 112 include instruments for detecting light, temperature, humidity, or measuring chemical concentrations or radioactivity.

State/variable memory 106 stores information about the present state of the system, including, for example, position, orientation, rates of rotation and translation in each axis. The state/variable memory 106 also stores information corresponding to an initial reference frame of the device upon, for example, the device being put in use (e.g., the device being switched on), as well as position and orientation information once the device is in use. In this way, some embodiments provide for the device 100 to utilize information of the state/variable memory 106 in order to maintain position and orientation information of the device 100 once the device starts moving.

Clock 108 provides timing information to processor 114. In one embodiment, clock 108 provides a timebase for measuring intervals and rates of change. In another embodiment, clock 108 provides day, date, year, time, and alarm functions. In one embodiment clock 108 allows device 100 to provide an alarm or alert at pre-set times.

Expansion port 120 provides a connection for addition of accessories or devices. Expansion port 120 provides for future expansion, as well as flexibility to add options or enhancements. For example, expansion port 120 is used to add peripherals, sensors, processing hardware, storage, displays, or actuators to the basic self-propelled device 100.

In one embodiment, expansion port 120 provides an interface capable of communicating with a suitably configured component using analog or digital signals. In various embodiments, expansion port 120 provides electrical interfaces and protocols that are standard or well-known. In one embodiment, expansion port 120 implements an optical interface. Exemplary interfaces appropriate for expansion port 120 include the Universal Serial Bus (USB), Inter-Integrated Circuit Bus (I2C), Serial Peripheral Interface (SPI), or ETHERNET.

Display 118 presents information to outside devices or persons. Display 118 can present information in a variety of forms. In various embodiments, display 118 can produce light in colors and patterns, sound, vibration, music, or combinations of sensory stimuli. In one embodiment, display 118 operates in conjunction with actuators 126 to communicate information by physical movements of device 100. For example, device 100 can be made to emulate a human head nod or shake to communicate "yes" or "no."

In one embodiment, display 118 is an emitter of light, either in the visible or invisible range. Invisible light in the infrared or ultraviolet range is useful, for example to send information invisible to human senses but available to specialized detectors. In one embodiment, display 118 includes an array of Light Emitting Diodes (LEDs) emitting various light frequencies, arranged such that their relative intensity is variable and the light emitted is blended to form color mixtures.

In one embodiment, display 118 includes an LED array comprising several LEDs, each emitting a human-visible primary color. Processor 114 varies the relative intensity of each of the LEDs to produce a wide range of colors. Primary colors of light are those wherein a few colors can be blended in different amounts to produce a wide gamut of apparent colors. Many sets of primary colors of light are known, including for example red/green/blue, red/green/blue/white, and red/green/blue/amber. For example, red, green and blue LEDs together comprise a usable set of three available primary-color devices comprising a display 118 in one embodiment. In other embodiments, other sets of primary colors and white LEDs are used.

In one embodiment, display 118 includes an LED used to indicate a reference point on device 100 for alignment.

Power 124 stores energy for operating the electronics and electromechanical components of device 100. In one embodiment, power 124 is a rechargeable battery. Inductive charge port 128 allows for recharging power 124 without a wired electrical connection. In one embodiment, inductive charge port 128 accepts magnetic energy and converts it to electrical energy to recharge the batteries. In one embodiment, charge port 128 provides a wireless communication interface with an external charging device.

Deep sleep sensor 122 puts the self-propelled device 100 into a very low power or "deep sleep" mode where most of the electronic devices use no battery power. This is useful for long-term storage or shipping.

In one embodiment, sensor 122 is non-contact in that it senses through the enclosing envelope of device 100 without a wired connection. In one embodiment, deep sleep sensor 122 is a Hall Effect sensor mounted so that an external magnet can be applied at a pre-determined location on device 100 to activate deep sleep mode.

Actuators 126 convert electrical energy into mechanical energy for various uses. A primary use of actuators 126 is to propel and steer self-propelled device 100. Movement and steering actuators are also referred to as a drive system or traction system. The drive system moves device 100 in rotation and translation, under control of processor 114. Examples of actuators 126 include, without limitation, wheels, motors, solenoids, propellers, paddle wheels and pendulums.

In one embodiment, drive system actuators 126 include two parallel wheels, each mounted to an axle connected to an independently variable-speed motor through a reduction gear system. In such an embodiment, the speeds of the two drive motors are controlled by processor 114.

However, it should be appreciated that actuators 126, in various embodiments, produce a variety of movements in addition to merely rotating and translating device 100. In one embodiment, actuators 126 cause device 100 to execute communicative or emotionally evocative movements, including emulation of human gestures, for example, head nodding, shaking, trembling, spinning or flipping. In some embodiments, processor coordinates actuators 126 with display 118. For example, in one embodiment, processor 114 provides signals to actuators 126 and display 118 to cause device 100 to spin or tremble and simultaneously emit patterns of colored light. In one embodiment, device 100 emits light or sound patterns synchronized with movements.

In one embodiment, self-propelled device 100 is used as a controller for other network-connected devices. Device 100 contains sensors and wireless communication capability, and so it can perform a controller role for other devices. For example, self-propelled device 100 can be held in the hand and used to sense gestures, movements, rotations, combination inputs and the like.

Figure 2A:
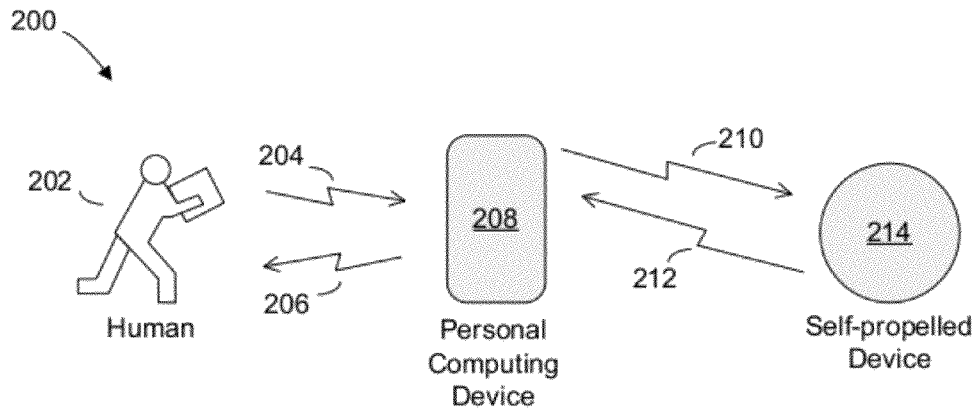
FIG. 2A is a schematic depiction of an embodiment comprising a self-propelled device and a computing device, under an embodiment.

FIG. 2A is a schematic depiction of an embodiment comprising a self-propelled device and a computing device, under an embodiment. More specifically, a self-propelled device 214 is controlled in its movement by programming logic and/or controls that can originate from a controller device 208. The self-propelled device 214 is capable of movement under control of the computing device 208, which can be operated by a user 202. The computing device 208 can wirelessly communicate control data to the self-propelled device 214 using a standard or proprietary wireless communication protocol. In variations, the self-propelled device 214 may be at least partially self-controlled, utilizing sensors and internal programming logic to control the parameters of its movement (e.g., velocity, direction, etc.). Still further, the self-propelled device 214 can communicate data relating to the device's position and/or movement parameters for the purpose of generating or alternating content on the computing device 208. In additional variations, self-propelled device 214 can control aspects of the computing device 208 by way of its movements and/or internal programming logic.

As described herein, the self-propelled device 214 may have multiple modes of operation, including those of operation in which the device is controlled by the computing device 208, is a controller for another device (e.g., another self-propelled device or the computing device 208), and/or is partially or wholly self-autonomous.

Additionally, embodiments enable the self-propelled device 214 and the computing device 208 to share a computing platform on which programming logic is shared, in order to enable, among other features, functionality that includes: (i) enabling the user 202 to operate the computing device 208 to generate multiple kinds of input, including simple directional input, command input, gesture input, motion or other sensory input, voice input or combinations thereof; (ii) enabling the self-propelled device 214 to interpret input received from the computing device 208 as a command or set of commands; and/or (iii) enabling the self-propelled device 214 to communicate data regarding that device's position, movement and/or state in order to effect a state on the computing device 208 (e.g., display state, such as content corresponding to a controller-user interface). Embodiments further provide that the self-propelled device 214 includes a programmatic interface that facilitates additional programming logic and/or instructions to use the device. The computing device 208 can execute programming that is communicative with the programming logic on the self-propelled device 214.

According to embodiments, the self-propelled device 214 includes an actuator or drive mechanism causing motion or directional movement. The self-propelled device 214 may be referred to by a number of related terms and phrases, including controlled device, robot, robotic device, remote device, autonomous device, and remote-controlled device. In some embodiments, the self-propelled device 214 can be structured to move and be controlled in various media. For example, self-propelled device 214 can be configured for movement in media such as on flat surfaces, sandy surfaces or rocky surfaces.

The self-propelled device 214 may be implemented in various forms. As described below and with an embodiment of FIG. 3, the self-propelled device 214 may correspond to a spherical object that can roll and/or perform other movements such as spinning. In variations, device 214 can correspond to a radio-controlled aircraft, such as an airplane, helicopter, hovercraft or balloon. In other variations, device 214 can correspond to a radio controlled watercraft, such as a boat or submarine. Numerous other variations may also be implemented, such as those in which the device 214 is a robot.

In one embodiment, device 214 includes a sealed hollow envelope, roughly spherical in shape, capable of directional movement by action of actuators inside the enclosing envelope.

Continuing to refer to FIG. 2A, device 214 is configured to communicate with computing device 208 using network communication links 210 and 212. Link 210 transfers data from device 208 to device 214. Link 212 transfers data from device 214 to device 208. Links 210 and 212 are shown as separate unidirectional links for illustration; in some embodiments a single bi-directional communication link performs communication in both directions. It should be appreciated that link 210 and link 212 are not necessarily identical in type, bandwidth or capability. For example, communication link 210 from computing device 208 to self-propelled device 214 is often capable of a higher communication rate and bandwidth compared to link 212. In some situations, only one link 210 or 212 is established. In such an embodiment, communication is unidirectional.

The computing device 208 can correspond to any device comprising at least a processor and communication capability suitable for establishing at least uni-directional communications with self-propelled device 214. Examples of such devices include, without limitation: mobile computing devices (e.g., multifunctional messaging/voice communication devices such as smart phones), tablet computers, portable communication devices and personal computers. In one embodiment, device 208 is an IPHONE available from APPLE COMPUTER, INC. of Cupertino, Calif. In another embodiment, device 208 is an IPAD tablet computer, also from APPLE COMPUTER. In another embodiment, device 208 is any of the handheld computing and communication appliances executing the ANDROID operating system from GOOGLE, INC.

In another embodiment, device 208 is a personal computer, in either a laptop or desktop configuration. For example, device 208 is a mufti-purpose computing platform running the MICROSOFT WINDOWS operating system, or the LINUX operating system, or the APPLE OS/X operating system, configured with an appropriate application program to communicate with self-propelled device 214.

In variations, the computing device 208 can be a specialized device, dedicated for enabling the user 202 to control and interact with the self-propelled device 214.

In one embodiment, multiple types of computing device 208 can be used interchangeably to communicate with the self-propelled device 214. In one embodiment, self-propelled device 214 is capable of communicating and/or being controlled by multiple devices (e.g., concurrently or one at a time). For example, device 214 can link with an IPHONE in one session and with an ANDROID device in a later session, without modification of device 214.

According to embodiments, the user 202 can interact with the self-propelled device 214 via the computing device 208, in order to control the self-propelled device and/or to receive feedback or interaction on the computing device 208 from the self-propelled device 214. According to embodiments, the user 202 is enabled to specify input 204 through various mechanisms that are provided with the computing device 208. Examples of such inputs include text entry, voice command, touching a sensing surface or screen, physical manipulations, gestures, taps, shaking and combinations of the above.

The user 202 may interact with the computing device 208 in order to receive feedback 206. The feedback 206 may be generated on the computing device 208 in response to user input. As an alternative or addition, the feedback 206 may also be based on data communicated from the self-propelled device 214 to the computing device 208, regarding, for example, the self-propelled device's position or state. Without limitation, examples of feedback 206 include text display, graphical display, sound, music, tonal patterns, modulation of color or intensity of light, haptic, vibrational or tactile stimulation. The feedback 206 may be combined with input that is generated on the computing device 208. For example, the computing device 208 may output content that is modified to reflect position or state information communicated from the self-propelled device 214.

In some embodiments, the computing device 208 and/or the self-propelled device 214 are configured such that user input 204 and feedback 206 maximize usability and accessibility for a user 202, who has limited sensing, thinking, perception, motor or other abilities. This allows users with handicaps or special needs to operate system 200 as described.

It should be appreciated that the configuration illustrated in the embodiment of FIG. 2A is only one of an almost unlimited number of possible configurations of networks including a self-propelled device with communication connections. Furthermore, while numerous embodiments described herein provide for a user to operate or otherwise directly interface with the computing device in order to control and/or interact with a self-propelled device, variations to embodiments described encompass enabling the user to directly control or interact with the self-propelled device 214 without use of an intermediary device such as computing device 208.

Figure 2B:
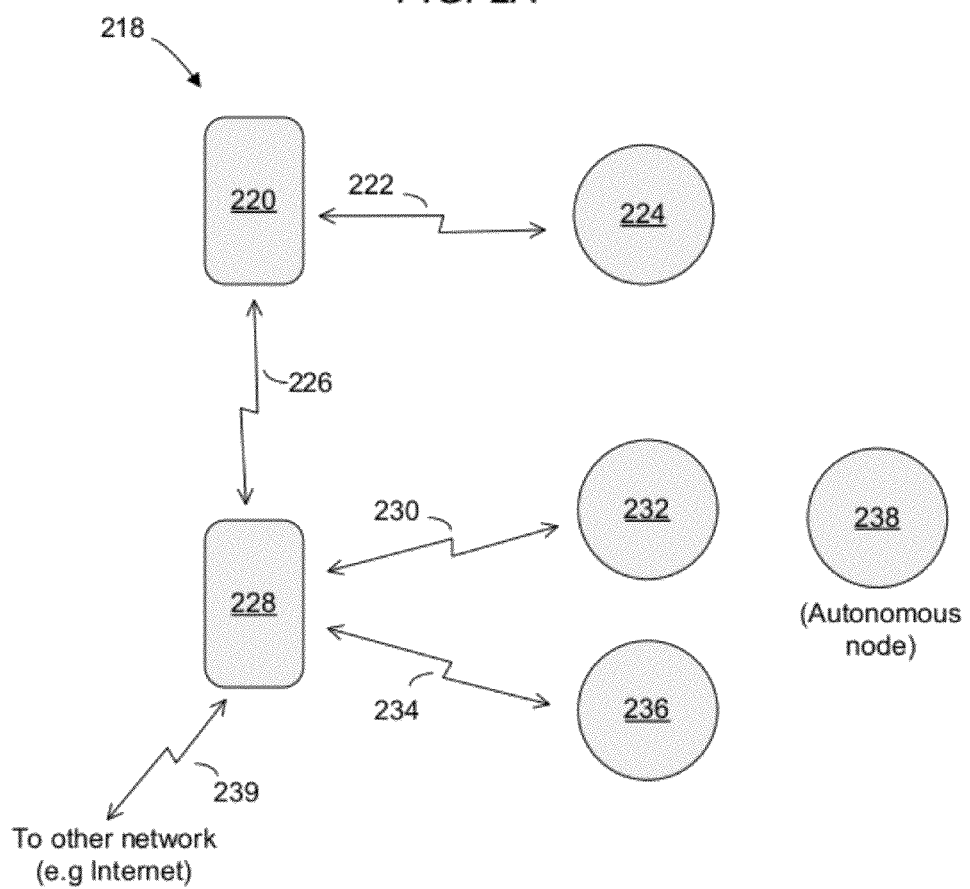
FIG. 2B depicts a system comprising computing devices and self-propelled devices, according to another embodiment.

FIG. 2B depicts a system 218 comprising computing devices and self-propelled devices, according to another embodiment. In the example provided by FIG. 2B, system 218 includes two computing devices 220 and 228, four self-propelled devices 224, 232, 236, and 238, and communication links 222, 226, 230, 234 and 239. The communication of computing device 220 with self-propelled device 224 using link 222 is similar to the embodiment depicted in network 200 of FIG. 2A; however, embodiments such as those shown enable additional communication to be established between two computing devices 220 and 228, via network link 226.

According to an embodiment such as provided with system 218, the computing devices 220, 228 may optionally control more than one self-propelled device. Furthermore, each self-propelled device 224, 232, 236, 238 may be controlled by more than one computing device 220, 228. For example, embodiments provide that computing device 228 can establish multiple communications links, including with self-propelled devices 232 and 236, and computing device 220.

In variations, the computing devices 220, 228 can also communicate with one or more self-propelled devices using a network such as the Internet, or a local wireless network (e.g., a home network). For example, the computing device 228 is shown to have a communications link 239, which can connect the computing device to an Internet server, a web site, or to another computing device at a remote location. In some embodiments, the computing device 228 can serve as an intermediary between the network source and a self-propelled device. For example, the computing device 228 may access programming from the Internet and communicate that programming to one of the self-propelled devices.

As an alternative or variation, the computing device 228 can enable a network user to control the computing device 228 in controlling one or more of the self-propelled devices 232, 236, etc. Still further, the computing device 228 can access the network source in order to receive programmatically triggered commands, such as a command initiated from a network service that causes one or more of the self-propelled devices to update or synchronize using the computing device 228. For example, the self-propelled device 232 may include image capturing resources, and a network source may trigger the computing device 228 to access the images from the self-propelled device, and/or to communicate those images to the network source over the Internet.

In variations, such remote network functionality may alternatively be communicated directly from a network source to the self-propelled devices 224, 232, 236. Thus, computing devices 220, 228 may be optional and various applications and uses. Alternatively, computing devices 220, 228 may be separated from the self-propelled devices 224, 232, 236 by a network such as the Internet. Thus, computing devices 220, 228 can alternatively be the network source that remotely controls and/or communicates with the self-propelled devices.

Figure 2C:
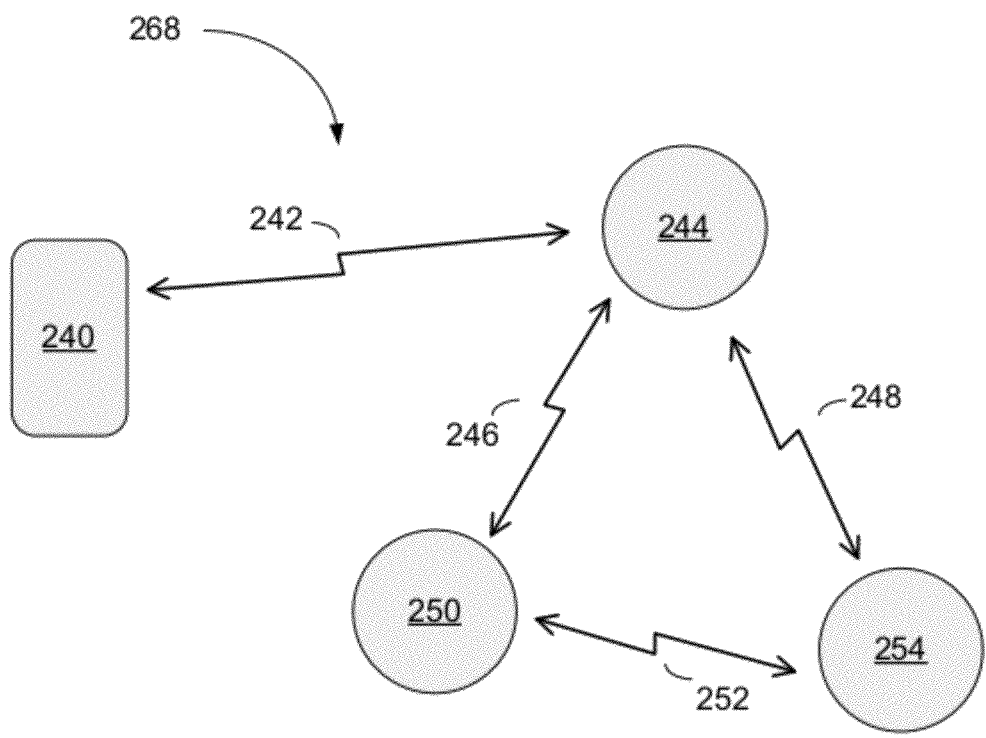
FIG. 2C is a schematic that illustrates a system comprising a computing device and multiple self-propelled devices, under another embodiment.

It should be noted that the data communication links 210, 212, 222, 226, 230, 234, 239, 242, 246, 248, and 252 in FIGS. 2A, 2B, and 2C are depicted as short and direct for purposes of illustration. However, actual links may be much more varied and complex. For example, link 226 connecting two computing devices 220 and 228 may be a low-power wireless link, if devices 220 and 228 are in close proximity. However, computing devices 220 and 228 may be far apart (e.g., separated by miles or geography), so long as suitable network communication can be established.

Thus, link 226 and all of the links 222, 230, 234, and 239 can employ a variety of network technologies, including the Internet, World Wide Web, wireless links, wireless radio-frequency communications utilizing network protocol, optical links, or any available network communication technology. The final connection to self-propelled devices 224, 232, 236 and 238 is preferably wireless so connecting wires do not restrict mobility.

In one embodiment, the communication links 222, 226, 230 and 234 are based on the wireless communication standard for data exchange known as BLUETOOTH. BLUETOOTH is widely available and provides a flexible communication framework for establishing data networks using short-wavelength radio transceivers and data encoding. BLUETOOTH incorporates security features to protect the data sent on the links from unauthorized observers or interference. Alternative wireless communication medium may also be employed, such as wireless USB, Wi-Fi, or proprietary wireless communications. Embodiments further contemplate that one or more of the communication links to 222, 226, 230 and 234 utilize short-range radiofrequency (RF) communication, and/or line-of-sight communications.

In various other embodiments, the communication links are based on other wireless communication systems. Various radio frequency data communication systems are available, including for example those known as WI-FI, IEEE 802.11a, IEEE 802.11b, IEEE 802.11g or 802.11n. Other radio frequency data links are formed using cellular telephone service or serial communication protocols using radio modems. In other embodiments, optical communication links are employed, including modulating properties of light and LASER beams.

Any suitable communication technology can be used to form the network links, whether presently known or available in the future. The features described herein are not dependent on any particular networking technology or standard.

In some embodiments, the communication established amongst the devices, such as amongst computing device 220, 228 and/or self-propelled devices 224, 232, 236, can be temporary, flexible and reconfigurable. A resulting network of such devices can be considered an "ad-hoc" network, or alternatively a "piconet," or "personal area network." In this respect, some implementations provide that the computing device is 220, 228 and self-propelled devices 224, 232, 236 can be considered nodes of the network, such as an ad-hoc network. In such configurations, network components, topology and communications paths are flexible and can be readily adjusted to accommodate addition or removal of devices, changing communication requirements or channel interference. For example, self-propelled device 238 in FIG. 2B is shown with no present network connection. However, self-propelled device 238 has connected to network 218 in the past and received instructions to enable it to operate without a persistent network link.

FIG. 2C is a schematic that illustrates a system 268 comprising a computing device and multiple self-propelled devices, under another embodiment. A computing device 240 is operable to communicate with one or more self-propelled devices 244, 250, 254. The computing device 240 may communicate commands or other control data, and received feedback similar to embodiments described above. The self-propelled devices 244, 250, 254 are configured to communicate and/or be controlled by the computing device 240. Additionally, the self-propelled devices 244, 250, 254 are configured to communicate and/or control one another.

In the example shown by FIG. 2C, the computing device 240 communicates with self-propelled device 244 using communications link 242. Self-propelled device 244 communicates with self-propelled device 250 using link 246 and with self-propelled device 254 using link 248. Self-propelled devices 250 and 254 communicate using link 252. The computing device 250 can send data to any of the self-propelled devices 244, 250, or 254, using device 244 as a relay. Alternatively, the computing device 240 can communicate with the other self-propelled devices 250, 254 directly.

The system 238 may include various configurations. For example, a user may operate computing device 240 to control self-propelled device 244. Movement of the self-propelled device 244 may be communicated both to the computing device 240 and to one or more of the other self-propelled devices 250, 254. Each of self-propelled devices may be preprogrammed to react in a specific manner based on state or position information communicated from another one of the self-propelled devices. For example, self-propelled devices 244, 250 may each be operated in a repel mode, so that the movement of self-propelled device 244 (as controlled from computing device 240) results in a repel motion by the self-propelled device 250. In other variations, self-propelled devices 244, 250, 254 may be preprogrammed to maintain a specific distance apart from one another, so that movement by one device automatically causes movement by the other two devices. Still further, the devices 244, 250, 254 may be configured so as to perform a variety of activities, such as, for example, (i) one self-propelled device automatically moving when another approaches a threshold distance; (ii) one self-propelled device programmatically moving to bump another self-propelled device; (iii) the self-propelled devices automatically moving in tandem based on input received by each of the self-propelled devices from the other self-propelled devices or from the computing device 240, and/or variations thereof.

The various systems 200, 218, 238 are illustrative of embodiments provided herein. With any of the systems described, variations include the addition of more or fewer computing devices, and/or more or fewer self-propelled devices. As described with some variations, additional sources or nodes can be provided from a remote network source. Additionally, in some operational environments, the presence of the computing device is optional. For example, the self-propelled devices can be partially or completely autonomous, using programming logic to function.

Spherical Mechanical Design

Figure 3:
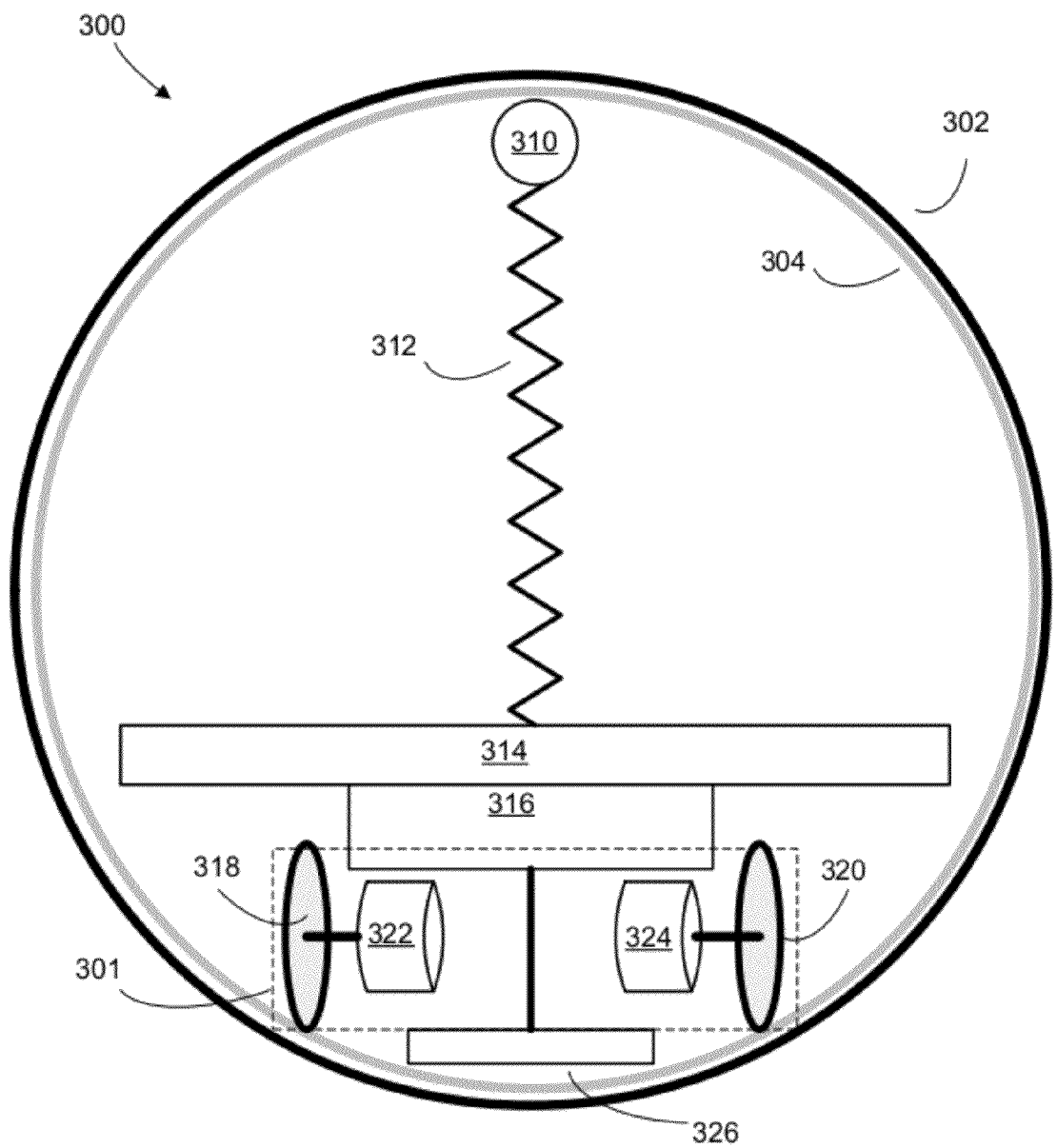
FIG. 3 is a block diagram illustrating the components of a self-propelled device that is in the form of a robotic, spherical ball, in accordance with an embodiment.

FIG. 3 is a block diagram illustrating the components of a self-propelled device 300 that is in the form of a robotic, spherical ball, in accordance with an embodiment. In one embodiment, robotic ball 300 is of a size and weight allowing it to be easily grasped, lifted, and carried in an adult human hand.

As shown, robotic ball 300 includes an outer spherical shell (or housing) 302 that makes contact with an external surface as the device rolls. In addition, robotic ball 300 includes an inner surface 304 of the outer shell 302. Additionally robotic ball 300 includes several mechanical and electronic components enclosed by outer shell 302 and inner surface 304 (collectively known as the envelope).

In the described embodiment, outer shell 302 and inner surface 304 are composed of a material that transmits signals used for wireless communication, yet are impervious to moisture and dirt. The envelope material can be durable, washable, and/or shatter resistant. The envelope may also be structured to enable transmission of light and is textured to diffuse the light.

In one embodiment, the housing is made of sealed polycarbonate plastic. In one embodiment, at least one of the outer shell 302 or inner surface 304 are textured to diffuse light. In one embodiment, the envelope comprises two hemispherical shells with an associated attachment mechanism, such that the envelope can be opened to allow access to the internal electronic and mechanical components.

Several electronic and mechanical components are located inside the envelope for enabling processing, wireless communication, propulsion and other functions (collectively referred to as the "interior mechanism"). Among the components, embodiments include a drive system 301 to enable the device to propel itself. The drive system 301 can be coupled to processing resources and other control mechanisms, as described with other embodiments. Referring again to FIG. 3, carrier 314 serves as the attachment point and support for components of the interior mechanism. The components of the interior mechanism are not rigidly attached to the envelope. Instead, the interior mechanism is in frictional contact with inner surface 304 at selected points, and is movable within the envelope by the action of actuators of the drive mechanism.

Carrier 314 is in mechanical and electrical contact with energy storage 316. Energy storage 316 provides a reservoir of energy to power the device and electronics and is replenished through inductive charge port 326. Energy storage 316, in one embodiment, is a rechargeable battery. In one embodiment, the battery is composed of lithium-polymer cells. In other embodiments, other rechargeable battery chemistries are used.

Carrier 314 can provide the mounting location for most of the internal components, including printed circuit boards for electronic assemblies, sensor arrays, antennas, and connectors, as well as providing a mechanical attachment point for internal components.

In one embodiment, the drive system 301 includes motors 322, 324 and wheels 318, 320. Motors 322 and 324 connect to wheels 318 and 320, respectively, each through an associated shaft, axle, and gear drive (not shown). The perimeter of wheels 318 and 320 are two points where the interior mechanism is in mechanical contact with inner surface 304. The points where wheels 318 and 320 contact inner surface 304 are an essential part of the drive mechanism of the ball, and so are preferably coated with a material to increase friction and reduce slippage. For example, wheels 318 and 320 are covered with silicone rubber tires.

In some embodiments, a biasing mechanism is provided to actively force the wheels 318, 320 against the inner surface 304. In an example provided, the spring 312 and end 310 can comprise a biasing mechanism. More specifically, spring 312 and spring end 310 are positioned to contact inner surface 304 at a point diametrically opposed to wheels 318 and 320. Spring 312 and end 310 provide additional contact force to reduce slippage of the wheels 318 and 320, particularly in situations where the interior mechanism is not positioned with the wheels at the bottom and where gravity does not provide adequate force to prevent the drive wheels from slipping. Spring 312 is selected to provide a small force pushing wheels 318 and 320, and spring end 310 evenly against inner surface 304.

Spring end 310 is designed to provide near-frictionless contact with inner surface 304. In one embodiment, end 310 comprises a rounded surface configured to mirror a low-friction contact region at all contact points with the inner surface 304. Additional means of providing near-frictionless contact may be provided. In another implementation, the rounded surface may include one or more bearings to further reduce friction at the contact point where end 310 moves along inner surface 304.

Spring 312 and end 310 are preferably made of a non-magnetic material to avoid interference with sensitive magnetic sensors.

Control Overview

FIGS. 4A, 4B and 4C illustrate a technique for causing controlled movement of a spherical self-propelled device 402, in accordance with one or more embodiments. In FIG. 4A, self-propelled device is at rest in a stable orientation. With an X-, Y-, Z-axes frame of reference, the center of mass 406 (or center of gravity) of the device is aligned directly below (Z axis) the center of rotation 408, causing the device to be at rest. Reference mark 404 is included in the drawing to illustrate movement (X, Y axes), but is not present on the actual self-propelled device 402.

To produce directed movement of self-propelled device 402, the center of mass 406 is displaced from under the center of rotation 408, as shown in FIG. 4B. With movement, the device 402 has an inherent dynamic instability (DIS) in one or more axes (e.g., see Y or Z axes). To maintain stability, the device uses feedback about its motion to compensate for the instability. Sensor input, such as provided from sensors 112 (see FIG. 1) or accelerometers or gyroscopes (see FIG. 6), can be used to detect what compensation is needed. In this way, the device maintains a state of dynamic inherent instability as it moves under control of sensors and control input, which can be communicated from another controller device.

The displacement 410 of center of mass 406 is caused by one or more actuators. When center of mass 406 is not aligned below center of rotation 408, a torque is created on device 402 about the center of rotation, causing device 402 to rotate to restore stability. When device 402 is in contact with a surface, rotation causes device 402 to move along the surface in the direction corresponding to the displacement 410.

FIG. 4C illustrates device 402 at rest after the movement, with reference mark 404 showing the distance device 402 has rotated from the initial position in FIG. 4A. Although the displacement of center of mass 406 and movement are shown in one dimension for illustration, the principle applies to create desired motion in any direction on a two-dimensional plane.

In some implementations, device 402 is configured with center of mass 406 being as near to the inner surface of the sphere as possible, or equivalently to arrange components so that center of mass 406 is as low as possible when the device is in a stable situation as shown in FIG. 4A.

Figure 5:
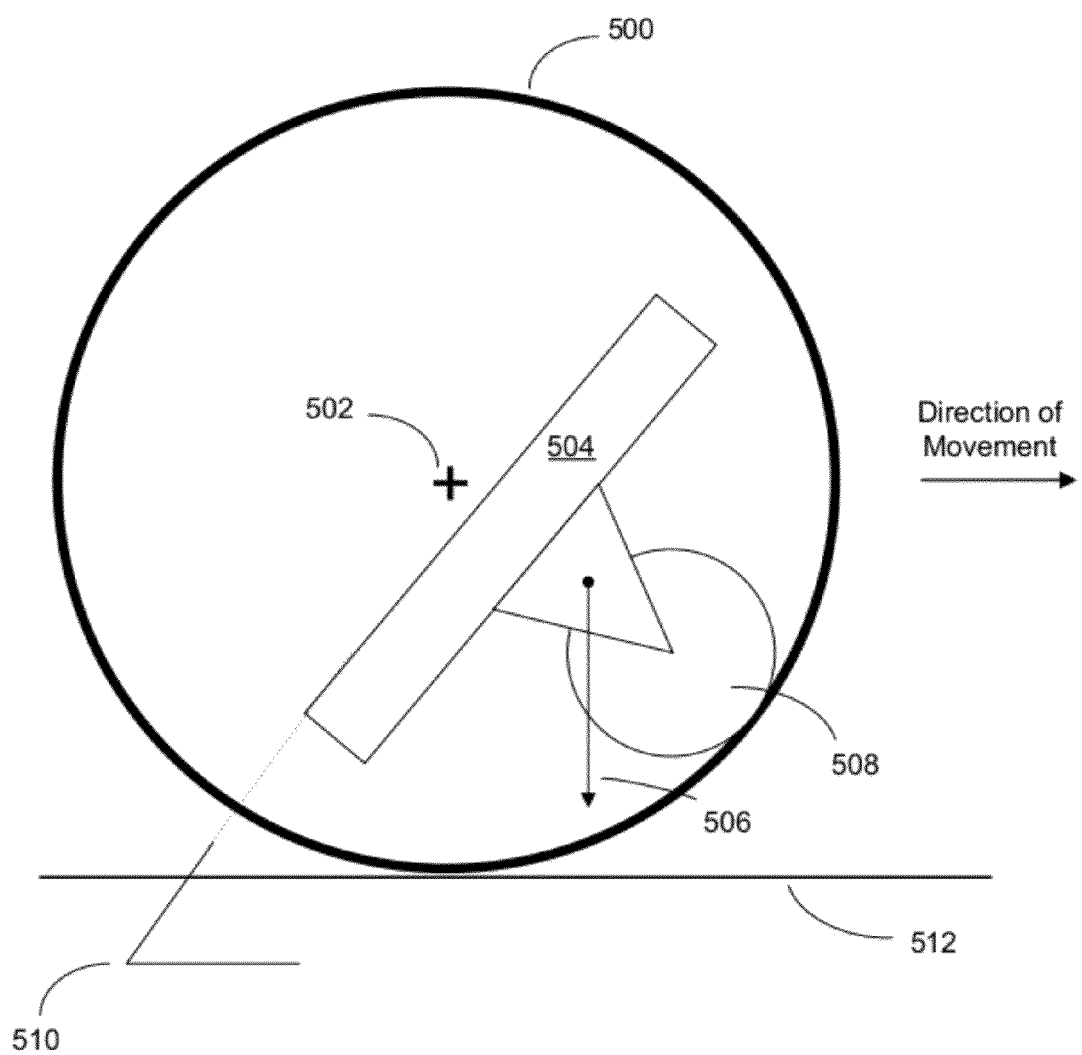
FIG. 5 further illustrates a technique for causing motion of a self-propelled spherical device, according to an embodiment.

FIG. 5 further illustrates a technique for causing motion of a self-propelled spherical device, according to an embodiment. In the FIG. 5, device 500 is shown, having center of rotation 502 and center of mass 506, and in contact with planar surface 512. The drive mechanism for robotic device 500 comprises two independently-controlled wheeled actuators 508 in contact with the inner surface of the enclosing spherical envelope of device 500. Also shown is sensor platform 504. Several components of device 500 are not shown in FIG. 5 for simplicity of illustration.

When it is desired that device 500 move at a constant velocity, the technique illustrated in FIGS. 4A, 4B and 4C can be extended as shown in FIG. 5. To achieve continuous motion at a constant velocity, the displacement of center of mass 506 relative to center of rotation 502 is maintained by action of wheeled actuators 508. The displacement of the center of mass 506 relative to center of rotation 502 is difficult to measure, thus it is difficult to obtain feedback for a closed-loop controller to maintain constant velocity. However, the displacement is proportional to the angle 510 between sensor platform 504 and surface 512. The angle 510 can be sensed or estimated from a variety of sensor inputs, as described herein. Therefore, in one embodiment, the speed controller for robotic device 500 can be implemented to use angle 510 to regulate speed for wheeled actuators 508 causing device 500 to move at a constant speed across surface 512. The speed controller determines the desired angle 510 to produce the desired speed, and the desired angle setpoint is provided as an input to a closed loop controller regulating the drive mechanism.

FIG. 5 illustrates use of angle measurement for speed control; however the technique can be extended to provide control of turns and rotations, with feedback of appropriate sensed angles and angular rates.

It can be seen from the foregoing discussion that knowledge of the orientation angles is useful, in various embodiments, for control of a self-propelled device. Measuring the orientation of the device is also useful for navigation and alignment with other devices.

Figure 6:
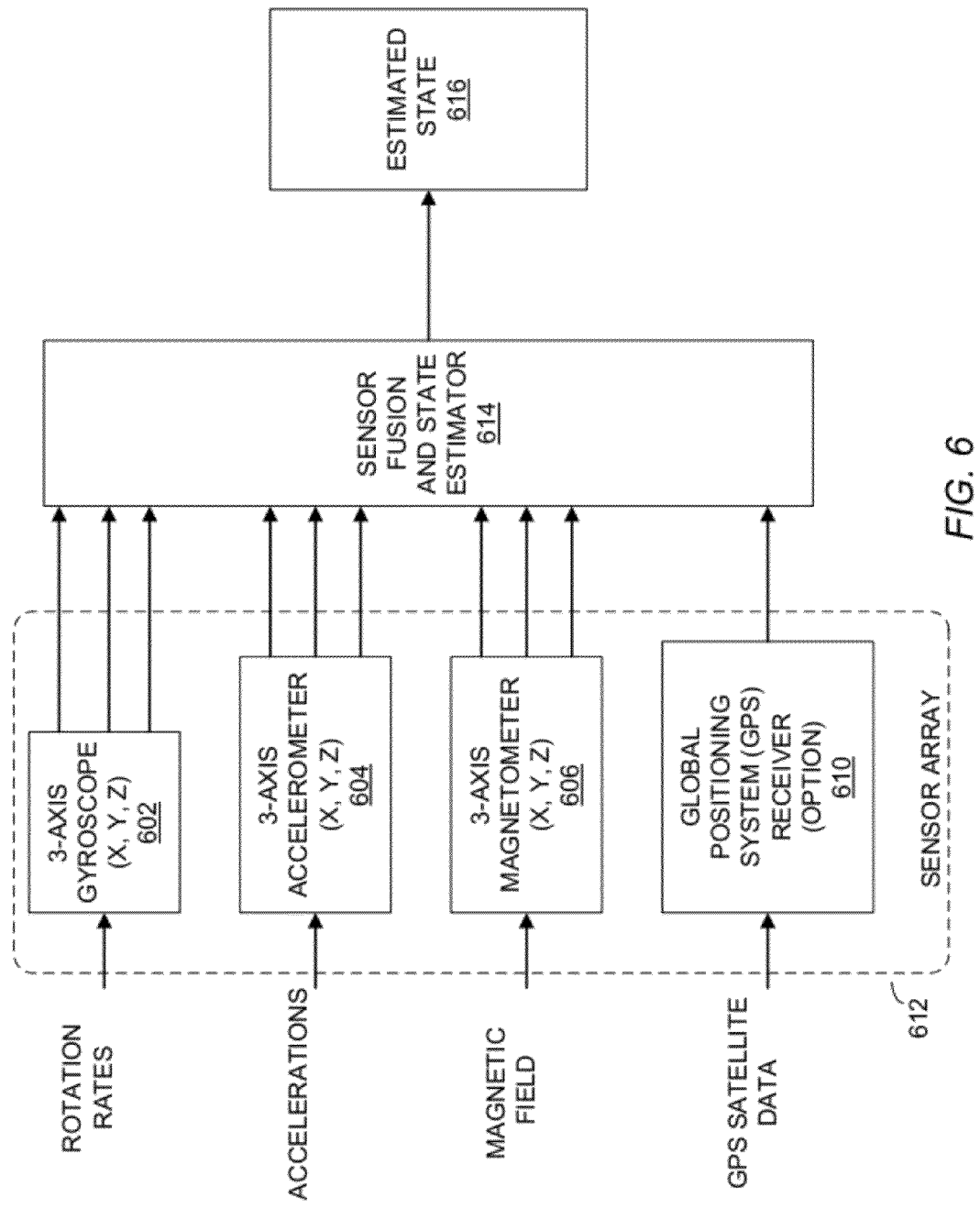
FIG. 6 is a block diagram depicting a sensor array and data flow, according to an embodiment.

FIG. 6 is a block diagram depicting a sensor array and data flow according to an embodiment. In FIG. 6, sensor array 612 provides a set of sensors for providing information to the self-propelled device, including for example, its position, orientation, rates of translation, rotation and acceleration. Many other sensors can be included to meet requirements in various embodiments.

In one embodiment, sensor array 612 includes a 3-axis gyroscope sensor 602, a 3-axis accelerometer sensor 604, and a 3-axis magnetometer sensor 606. In one embodiment a receiver for the Global Positioning System (GPS) is included. However, GPS signals are typically unavailable indoors, so the GPS receiver is often omitted.

Due to limitations in size and cost, sensors in sensor array 612 are typically miniaturized devices employing micro-electro-mechanical (MEMS) technology. The data from these sensors requires filtering and processing to produce accurate state estimates 616. Various algorithms are employed in sensor fusion and state estimator 614. These algorithms are executed by the processor on the self-propelled device.

Those familiar with the art will understand that the signals from sensor in sensor array 612 are imperfect and distorted by noise, interference and the limited capability of inexpensive sensors. However, the sensors also provide redundant information, so that application of a suitable sensor fusion and state estimator process 614 provides an adequate state estimation 616 of the true state of the self-propelled device.

For example, in many situations, magnetometer data is distorted by stray magnetic fields and ferrous metals in the vicinity. Sensor fusion and state estimator 614 are configured to reject bad or suspect magnetometer data and rely on the remaining sensors in estimating the state 616 of the self-propelled device. In some embodiments, particular movements of the self-propelled device can be used to improve sensor data for desired purposes. For example, it can be useful to rotate self-propelled device through an entire 360 degree heading sweep while monitoring magnetometer data, to map local magnetic fields. Since the fields are usually relatively invariant over a short period of time, the local field measurement is repeatable and therefore useful, even if distorted.

Architecture

Figure 7:
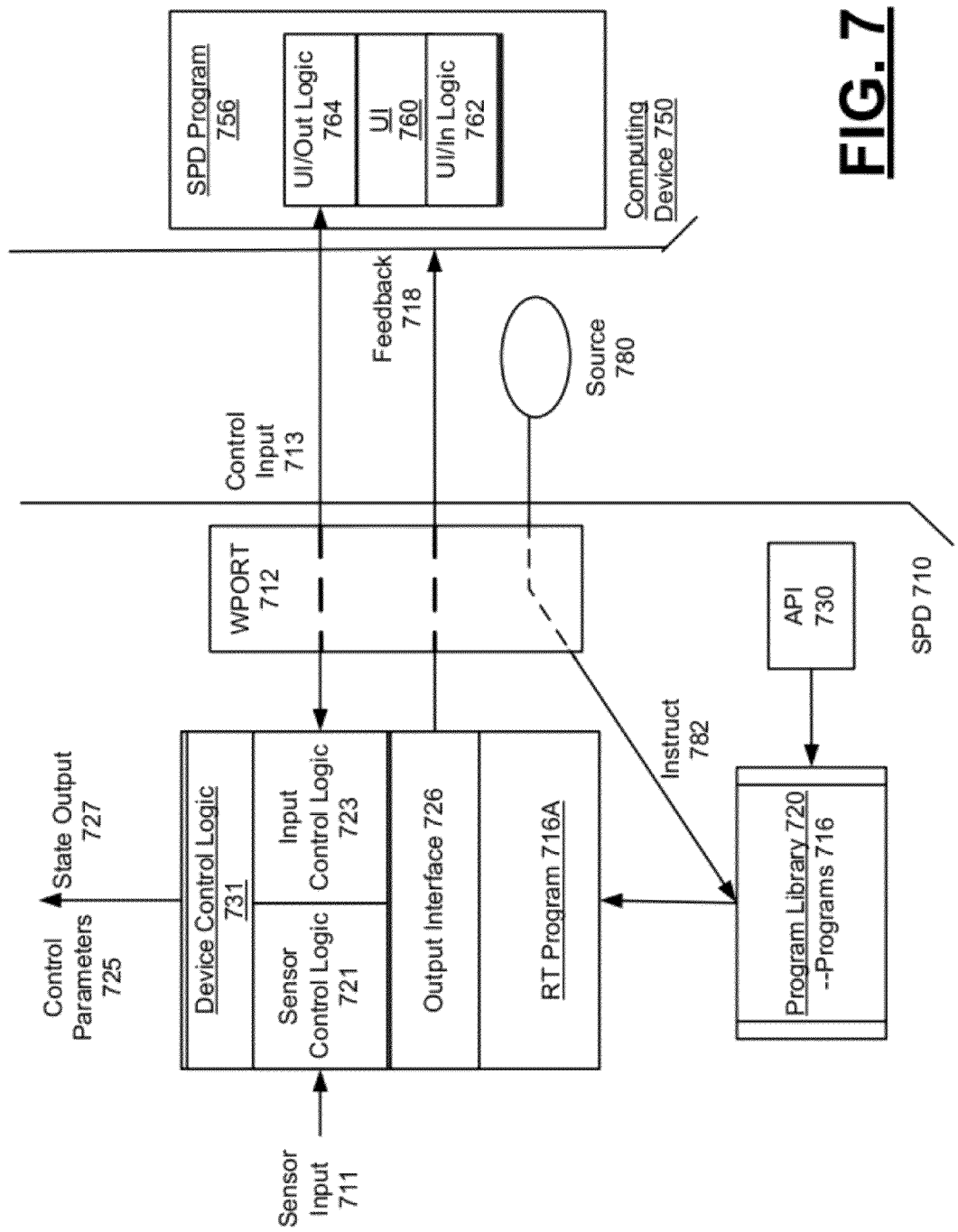
FIG. 7 illustrates a system including a self-propelled device, and a controller computing device that controls and interacts with the self-propelled device, according to one or more embodiments.

FIG. 7 illustrates a system including a self-propelled device, and a controller computing device that controls and interacts with the self-propelled device, according to one or more embodiments. In an embodiment, a self-propelled device 710 may be constructed using hardware resources such as described with an embodiment of FIG. 1. In one implementation, self-propelled device 710 is a spherical object such as described with an embodiment of FIG. 3. A computing device 750 can be a multifunctional device, such as a mobile computing device (e.g., smart phone), tablet or personal computer in device. Alternatively, computing device 750 can correspond to a specialized device that is dedicated to controlling and communicating with the self-propelled device 710.

In an embodiment, self-propelled device 710 is configured to execute one or more programs 716 stored in a program library 720. Each program 716 in the program library 720 can include instructions or rules for operating the device, including instructions for how the device is to respond to specific conditions, how the device is to respond to control input 713 (e.g., user input entered on the computing device 720), and/or the mode of operation that the device is to implement (e.g., controlled mode, versus autonomous, etc.).

The program library 720 may also maintain an instruction set that is shared by multiple programs, including instructions that enable some user input to be interpreted in a common manner. An application program interface (API) 730 can be implemented on the device 710 to enable programs to access a library of functions and resources of the device. For example, the API 730 may include functions that can be used with programs to implement motor control (e.g., speed or direction), state transition, sensor device interpretation and/or wireless communications.

In one implementation, the device 710 receives programs and programming instructions wirelessly through use of the wireless communication port 712. In variations, the device 710 receives programs and programming instructions 782 from external sources 780 via other ports, such as expansion port 120 (see FIG. 1). The programming resources may originate from, for example, a media provided to the user of the device (e.g., SD card), a network resource or website where programs can be downloaded, and/or programs and/or instruction sets communicated via the wireless communication port 712 from the computing device 750. In one implementation, the computing device 750 can be programmatically configured to interact and/or control the self-propelled device 710 with software. Once configured, the computing device 750 communicates instructions coinciding with its programmatic configuration to the self-propelled device 710. For example, the computing device 750 may download an application for controlling or interacting with the self-propelled device 710. The application can be downloaded from, for example, a network (e.g., from an App Store), or from a website, using wireless communication capabilities inherent in the computing device 750 (e.g., cellular capabilities, Wi-Fi capabilities, etc.). The application that is downloaded by the computing device 750 may include an instruction set that can be communicated to the self-propelled device 710.

In an embodiment, the computing device 750 executes a program 756 that is specialized or otherwise specific to communicating or interacting with, and/or controlling the self-propelled device 710. In some embodiments, the program 756 that executes on the computing device 750 includes a counterpart program 716A that can execute on the self-propelled device 710. The programs 756, 716A can execute as a shared platform or system. For example, as described below, the program 756 operating on the computing device 750 may cooperate with the counterpart runtime program 716A to generate input for the self-propelled device 710, and to generate output on the computing device 750 based on a data signal from the self-propelled device 710. In an embodiment, the program 756 generates a user interface 760 that (i) prompts or provides guidance for the user to provide input that is interpretable on the self-propelled device 710 as a result of the counterpart runtime program 716A, resulting in some expected outcome from the self-propelled device 710; (ii) receives feedback 718 from the self-propelled device 710 in a manner that affects the content that is output by the program 756 operating on the computing device 750. In the latter case, for example, computer-generated content may be altered based on positioning or movement of the self-propelled device 710.

More specifically, on the computing device, the program 756 can provide a user interface 760, including logic 762 for prompting and/or interpreting user input on the computing device. Various forms of input may be entered on the computing device 750, including, for example, user interaction with mechanical switches or buttons, touchscreen input, audio input, gesture input, or movements of the device in a particular manner.

Accordingly, the program 756 can be configured to utilize an inherent application program interface on the computing device 750, to utilize the various resources of the device to receive and process input. Many existing multifunctional or general purpose computing devices (e.g., smart phones or tablets) are configured to detect various kinds of input, including touchscreen input (e.g., multitouch input gesture input), optical input (e.g., camera image sensing input), audio input and device movement input (e.g., shaking or moving the entire device). The user interface 760 may include logic 762 to prompt the user for specific kinds of input (e.g., include visual markers where a user should place fingers, instruct the user or provide the user with the visual and/or audio prompt to move the device, etc.), and to interpret the input into control information that is signaled to the self-propelled device.

In some embodiments or implementations, the input generated on the computing device 750 is interpreted as a command and then signaled to the self-propelled device 710. In other embodiments or implementations, the input entered on the computing device 750 is interpreted as a command by programmatic resources on the self-propelled device 710. By interpreting user input in the form of commands, embodiments provide for the self-propelled device 710 to respond to user input in a manner that is intelligent and configurable. For example, the self-propelled device 710 may interpret user input that is otherwise directional in nature in a manner that is not directional. For example, a user may enter gesture input corresponding to a direction, in order to have the self-propelled device 710 move in a manner that is different than the inherent direction in the user input. For example, a user may enter a leftward gesture, which the device may interpret (based on the runtime program 716A) as a command to stop, spin, return home or alter illumination output, etc.

The user interface 760 may also include output logic 764 for interpreting data received from the self-propelled device 710. As described with other embodiments, the self-propelled device 710 may communicate information, such as state information and/or position information (e.g., such as after when the device moves) to the computing device 750. In one implementation, the communication from the self-propelled device 710 to the computing device 750 is in response to a command interpreted from user input on the computing device 750. In another implementation, the communication from the self-propelled device 710 may be in the form of continuous feedback generated as result of the device's continuous movement over a duration of time. As described with other implementations and embodiments, the output onto device 750 may correspond to a computing device having one of various possible form factors. The program 756 may configure the interface to graphically provide gaming context and/or different user-interface paradigms for controlling the self-propelled device 710. The program 756 may operate to directly affect the content generated in these implementations based on movement, position or state of the self-propelled device 710.

In operation, the self-propelled device 710 implements the programmatic runtime 716A using one or more sets of program instructions stored in its program library 720. The program runtime 716A may correspond to, for example, a program selected by the user, or one that is run by default or in response to some other condition or trigger. Among other functionality, the program runtime 716A may execute a set of program-specific instructions that utilizes device functions and/or resources in order to: (i) interpret control input from the computing device 750; (ii) control and/or state device movement based on the interpretation of the input; and/or (iii) communicate information from the self-propelled device 710 to the computing device 750.

In an embodiment, the program runtime 716A implements drive control logic 731, including sensor control logic 721 and input control logic 723. The sensor control logic 721 interprets device sensor input 711 for controlling speed, direction or other movement of the self-propelled device's drive system or assembly (e.g., see FIG. 1, 3 or 8D). The sensor input 711 may correspond to data such as provided from the accelerometer(s), magnetometer(s) or gyroscope(s) of the self-propelled device 710. The sensor data can also include other information obtained on a device regarding the device's movement, position, state or operating conditions, including GPS data, temperature data, etc. The program 716A may implement parameters, rules or instructions for interpreting sensor input 711 as drive assembly control parameters 725. The input control logic 723 interprets control input 713 received from the computing device 750. In some implementations, the logic 723 interprets the input as a command, in outputting drive assembly control parameters 725 that are determined from the input 713. The input drive logic 723 may also be program specific, so that the control input 713 and/or its interpretation are specific to the runtime program 716A. The drive assembly control logic uses the parameters, as generated through sensor/input control logic 721, 723 to implement drive assembly controls 725.

In variations, the sensor/input control logic 721, 723 is used to control other aspects of the self-propelled device 710. In embodiments, the sensor/input control logic 721, 723 may execute runtime program 716A instructions to generate a state output 727 that controls a state of the device in response to some condition, such as user input our device operation condition (e.g., the device comes to stop). For example, an illumination output (e.g., LED display out), audio output, or device operational status (e.g., mode of operation, power state) may be affected by the state output 727.

Additionally, the run time program 716A generates an output interface 726 for the self-propelled device program 756 running on the computing device 750. The output interface 726 may generate the data that comprises feedback 718. In some embodiments, the output interface 726 generates data that is based on position, movement (e.g., velocity, rotation), state (e.g., state of output devices), and/or orientation information (e.g., position and orientation of the device relative to the initial reference frame). The output interface 726 may also generate data that, for example, identifies events that are relevant to the runtime program 716A. For example the output interface 726 may identify events such as the device being disrupted in its motion or otherwise encountering a disruptive event. In some embodiments, output interface 726 may also generate program specific output, based on, for example, instructions of the runtime program 716A. For example, runtime program 716A may require a sensor reading that another program would not require. The output interface 726 may implement instructions for obtaining the sensor reading in connection with other operations performed through implementation of the runtime program 716A.

According to embodiments, self-propelled device 710 is operable in multiple modes relative to computing device 750. In a controlled mode, self-propelled device 710 is controlled in its movement and/or state by control input 713, via control signals 713 communicated from the computing device 750. In some implementations, the self-propelled device 710 pairs with the computing device 750 in a manner that affects operations on the computing device as to control or feedback. In some embodiments, self-propelled device 710 is also operable in an autonomous mode, where control parameters 725 are generated programmatically on the device in response to, for example, sensor input 711 and without need for control input 713. Still further, in variations, the self-propelled device 710 can act as a controller, either for the computing device 750 or for another self-propelled device 710. For example, the device may move to affect a state of the computing device 750. The device can operate in multiple modes during one operating session. The mode of operation may be determined by the runtime program 716A.

As described by an embodiment of FIG. 7 and elsewhere in the application, the self-propelled device 710 can include a library of instruction sets for interpreting control input 713 from the computing device 750. For example, the self-propelled device can store instructions for multiple programs, and the instructions for at least some of the programs may include counterpart programs that execute on the controller device 750. According to embodiments, the library that is maintained on the self-propelled device is dynamic, in that the instructions stored can be added, deleted or modified. For example, a program stored on the self-propelled device may be added, or another program may be modified.

When executed on the computing device 750, each program may include instructions to recognize a particular set of inputs, and different programs may recognize different inputs. For example, a golf program may recognize a swing motion on the computing device 750 as an input, while the same motion may be ignored by another program that is dedicated to providing a virtual steering mechanism. When executed on the self-propelled device 710, each program may include instructions to interpret or map the control input 713 associated with a particular recognized input to a command and control parameter.

In embodiments, the self-propelled device is able to dynamically reconfigure its program library. For example, an embodiment provides that a program can be modified (e.g., through instructions received by the controller device) to process control input 713 that corresponds to a new recognized input. As another example, an embodiment provides that the self-propelled device is able to switch programs while the self-propelled device is in use. When programs are switched, a different set of inputs may be recognized, and/or each input may be interpreted differently on the self-propelled device 710.

Figure 8A:
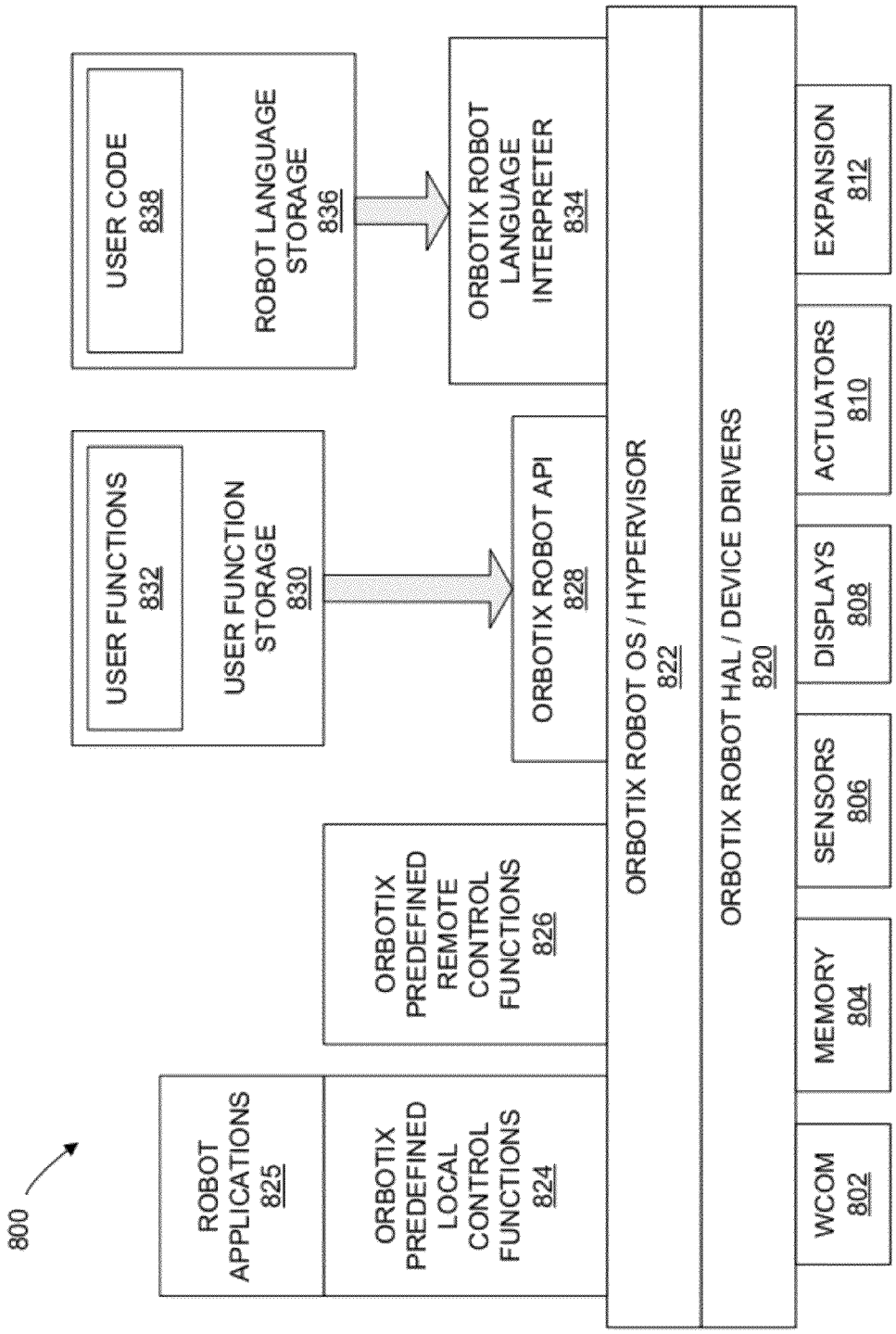
FIG. 8A illustrates a more detailed system architecture for a self-propelled device and system, according to an embodiment.

FIG. 8A illustrates a more detailed system architecture 800 for a self-propelled device and system, according to an embodiment. As has been previously discussed herein, in various embodiments, the self-propelled device 800 comprises multiple hardware modules, including wireless communication 802, memory 804, sensors 806, displays 808, actuators 810 and an expansion port 812. Each of these modules is interfaced with a set of software known as device drivers or hardware abstraction layer (HAL) 820. HAL 820 provides isolation between specific hardware and higher layers of the software architecture.

An operating system 822 provides for support of general hardware input and output, scheduling tasks, and managing resources to perform tasks. The operating system 822 is also sometimes known as a "hypervisor" which provides for sharing of resources among tasks, for example, if two software modules request control of the actuators simultaneously, operation policy established by hypervisor 822 resolves the contention.

ORBOTIX predefined local control functions 824 comprise control loops and library routines useful to robot applications 825. In some embodiments, a set of local robot applications 825 controls some or all of the features of self-propelled device 800. In some embodiments, a set of predefined remote control functions 826 interfaces with a remote controller device such as a computing device, using wireless link 802.

In one embodiment, a Robot Application Programming Interface (API) 828 provides a documented set of functions usable to control and monitor the device hardware and functions. API functions, also known as user functions 832, can be supplied by a user or obtained from a software repository or website and downloaded to the self-propelled device. User functions 832 are stored in user function storage 830.

In one embodiment, a robot language interpreter 834 is provided. The robot language interpreter 834 processes program instructions written in a simple, easy to understand format. For example, in one embodiment, language interpreter 834 processes instructions written in a variant of the BASIC programming language with extensions for reading robot sensors 806, controlling displays 808 and actuators 810, and interfacing with other robot device hardware and features. Robot language interpreter 834 also provides protection and security against performing destructive or unwise operations. In one embodiment, language interpreter 834 understands the ORBBASIC language from ORBOTIX. Robot language code 838 is stored in dedicated robot language storage 836.

An example of user code 838, when executed by interpreter 834, causes the self-propelled device's LED display to change color in response to the measured speed of movement of the device. Thus it can be seen that a user-supplied function can control one element of the device, such as LED display, while other elements (speed and direction) remain controlled through the wireless connection and remote control device.

Thus, multiple methods are provided for a user to add programmatic instructions to control and extend the features of the self-propelled device. API 828 provides a powerful interface for a sophisticated user, while language interpreter 834 provides a simple and safer interface for a novice that can also negate time lags in communication with a controller device.

Figure 8B:
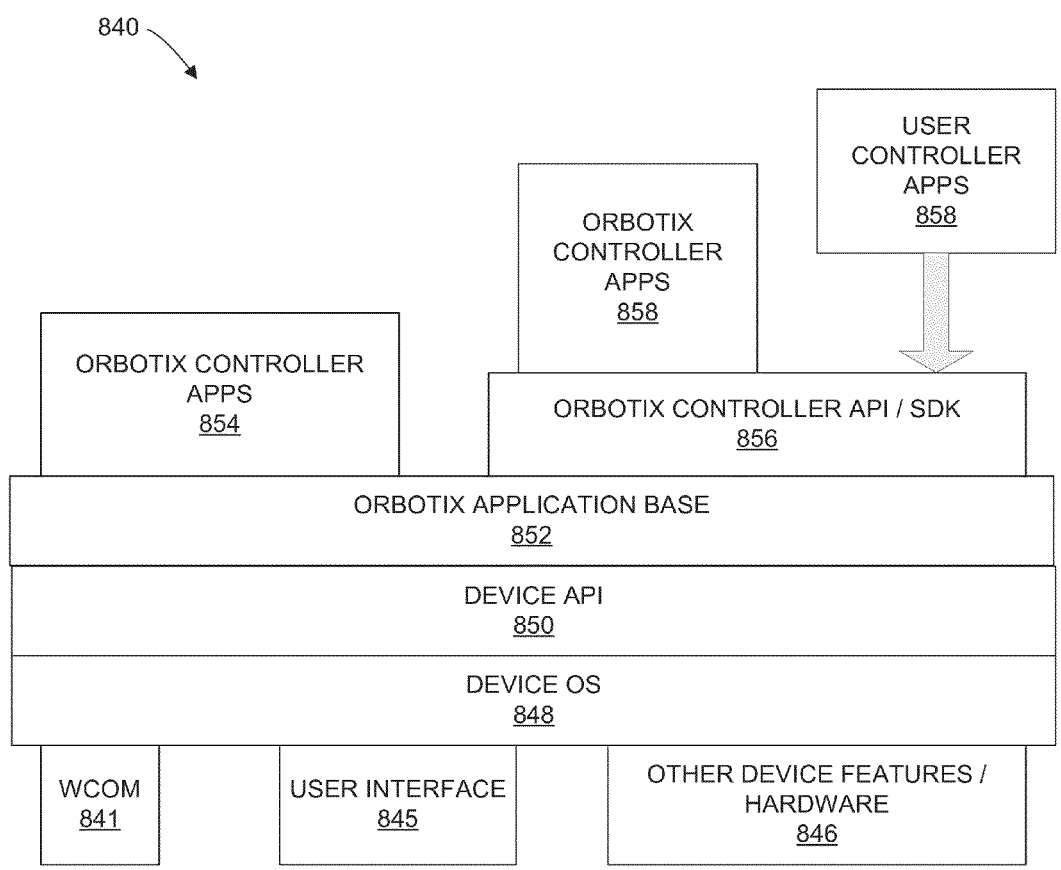
FIG. 8B illustrates the system architecture of a computing device, according to an embodiment.

FIG. 8B illustrates the system architecture of a computing device 840, according to an embodiment. As previously described herein, computing devices useful in networks with self-propelled devices typically provide a wireless communication interface 841, a user interface 845, with other hardware and features 846.

Device 840 typically provides an operating system 848, for example iOS for an APPLE IPHONE and ANDROID OS for ANDROID computing devices. Also provided is an API 850 for applications. ORBOTIX application base 852 provides basic connectivity to device API 850 and device OS 848 with higher layers of application software.

ORBOTIX controller application programs, or "apps" 854 and 858, provide user experiences and interaction with self-propelled devices. For example, in various embodiments, apps 854 and 858 provide control of a self-propelled device using touch-sensing control or a simulated joystick controller. Apps 854 and 858 can also provide a solo or multi-player game experience using self-propelled or robotic devices.

In some embodiments, controller apps 854 and 858 use sensors on device 840 to allow gestural control of a physical device in a real world environment, controlling a self-propelled or robotic device. For example, a user can make a gesture used in a sports game—a tennis swing or golf swing. The gesture is sensed on device 840 and processed by a software app to cause corresponding motion of the self-propelled device.

ORBOTIX API/SDK (Software Development Kit) 856 provides a documented set of interface functions useful to a user desiring to create custom applications 858 on a controller device for use with a self-propelled robotic device.

App 854 differs from app 858 in that app 854 is built directly on the application base layer 852, while app 858 is built on ORBOTIX controller API/SDK 856.

Figure 8C:
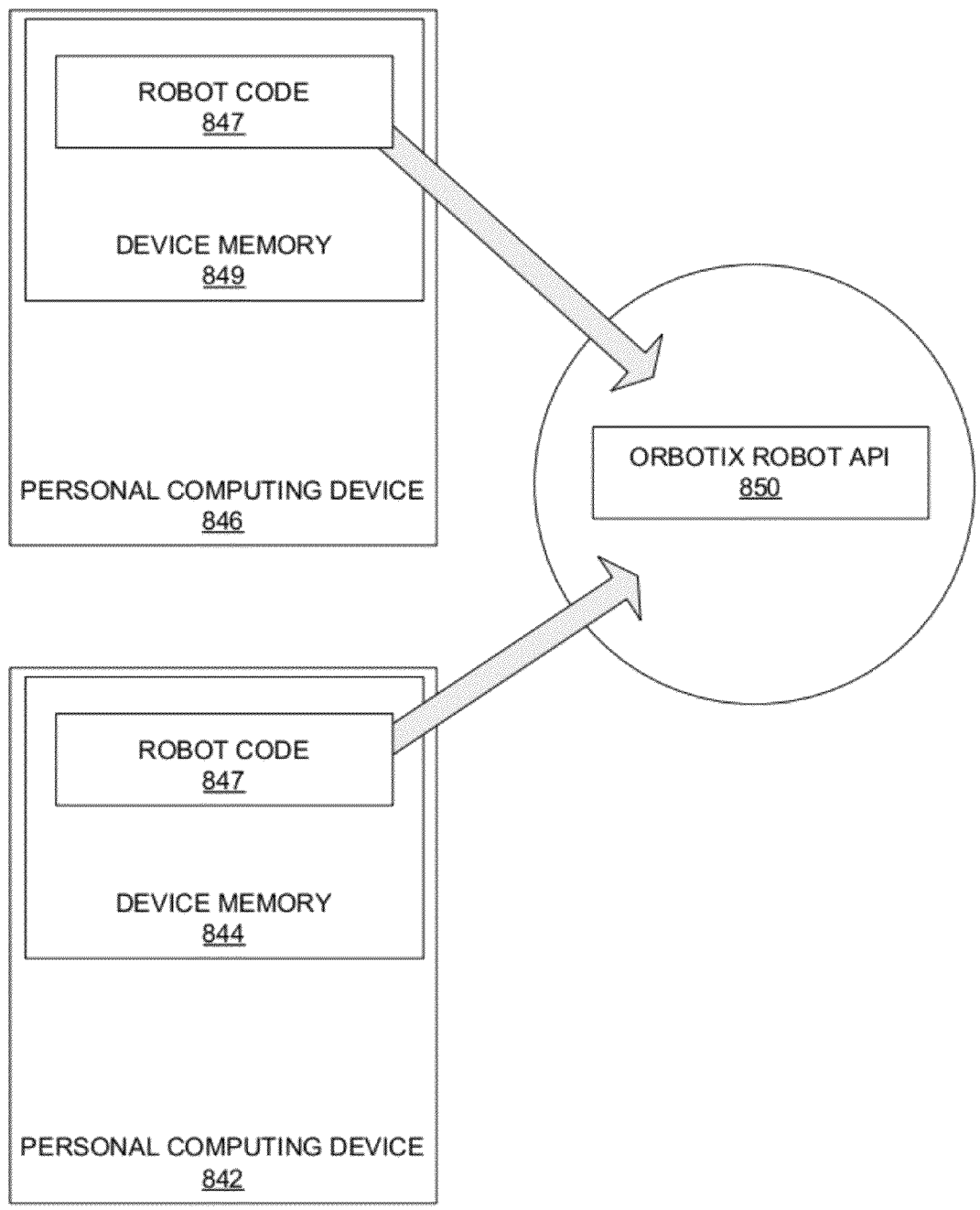
FIG. 8C illustrates a particular feature of code execution, according to an embodiment.

FIG. 8C illustrates a particular feature of code execution according to an embodiment. Shown are two computing devices 842 and 846. Device 842 is not necessarily the same type as device 846. One device may be an IPHONE and one an ANDROID phone. Each device has an associated memory storage area, memory 849 for device 846 and memory 844 for device 842. Robot code 847 is loaded into both memories 844 and 849, and is subsequently available to transfer to robot API 850.

A notable feature in this embodiment is that code module 847 is stored and transferred into robot API 850 using an intermediate computing device 842 or 846, and the type of the computing device does not matter. This makes it possible for computing devices to store various code modules or "helper apps" that can be downloaded to robotic devices as needed, for example to expedite a particular task.

It should be appreciated that the embodiments and features discussed in relation to FIGS. 8A, 8B and 8C provide a highly flexible distributed processing platform, wherein tasks can be readily moved between a controller and controlled device.

Control Systems

According to at least some embodiments, a self-propelled device such as described by various examples herein moves in accordance with a three-dimensional reference frame (e.g., X-, Y- and Z-axes), but operates using input that is received from a device that uses a two-dimensional reference frame (e.g., X-, Y-axes). In an embodiment, the self-propelled device maintains an internal frame of reference about the X-, Y- and Z-axes. The self-propelled device is able to receive control input from another device, in which the control input is based on a two-dimensional reference frame and further controls the movement of the self-propelled device about the X-, Y- and Z-axes.

Figure 8D:
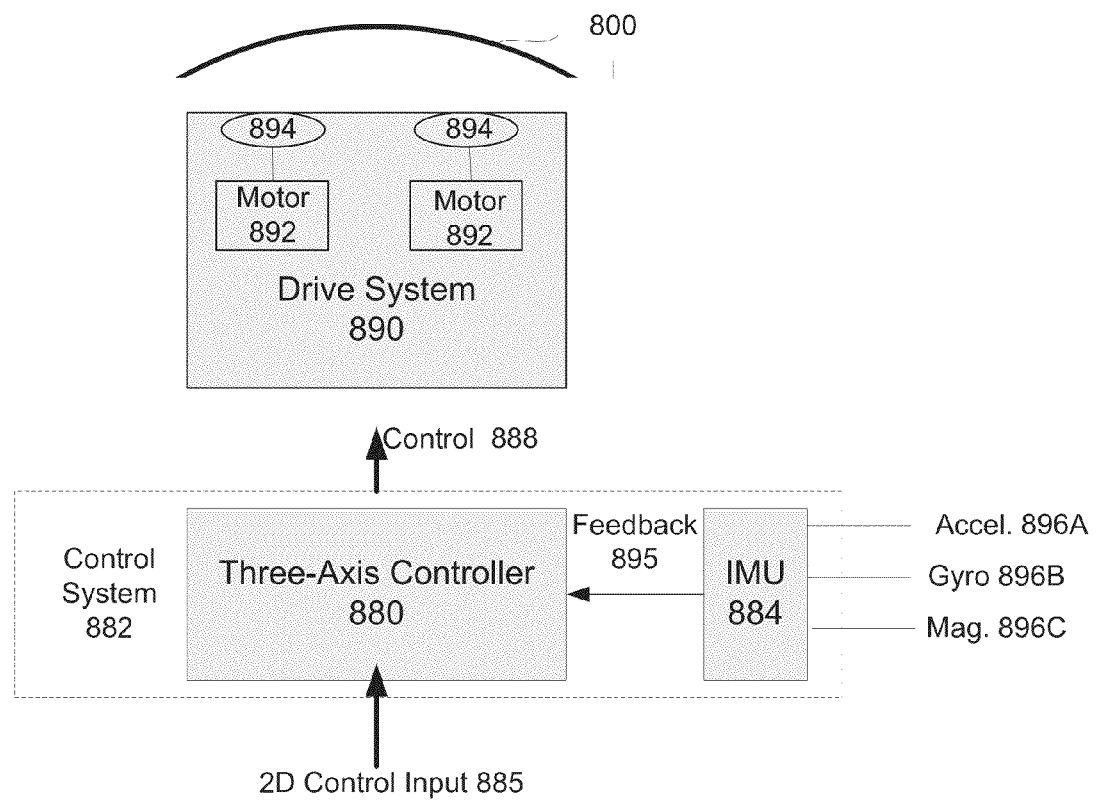
FIG. 8D illustrates an embodiment in which a self-propelled device 800 implements control using a three-dimensional reference frame and control input that is received from another device that utilizes a two-dimensional reference frame, under an embodiment.

FIG. 8D illustrates an embodiment in which a self-propelled device 800 implements control using a three-dimensional reference frame and control input that is received from another device that utilizes a two-dimensional reference frame, under an embodiment. The self-propelled device 800 (assumed to be spherical) includes a control system 882 that includes a three-axis controller 880 and an inertial measurement unit (IMU) 884. The IMU 884 uses sensor input to provide feedback that the controller 880 can use to independently determine a three-dimensional frame of reference for controlling a drive system 890 (e.g., see FIG. 3) of the self-propelled device. Specifically, the three-axis controller 880 operates to implement control on motors 892 (or wheels 894) of the drive system 890. For example, the three-axis controller 880 operates to determine the speeds at which each of two parallel wheeled motors 894, 894 are to spin. It should be appreciated that the two motors 892, 892, which can be operated in varying degrees of cooperation and opposition, are capable of moving the sphere 800 in many rotational and translational motions to achieve a desired movement. In one embodiment, the motors 892, 892 are capable of rotating at varying speeds in both forward and reverse directions to affect the movement of the corresponding wheels 894, 894. In another embodiment, each motor 892, 892 speed is varied from zero to a maximum in one direction.

The controller 880 and IMU 884 can be implemented through separate hardware and/or software. In one implementation, the controller 880 and IMU 884 are implemented as separate software components that are executed on, for example, processor 114 (see FIG. 1).

More specifically, the controller 880 measures or estimates the present state of the self-propelled device 800, including pitch, roll, and yaw angles based on feedback 895. The feedback 895 may originate from, for example, one or more accelerometers 896A, gyroscope 896B, magnetometer 896C, and/or other devices (e.g., GPS), which determine the feedback when the device is in motion.

In one embodiment, controller 880 receives feedback 895 from the IMU 884 as to the motion of the device along three axes, including a desired pitch input, a desired roll input and a desired yaw input. In one variation, the feedback 895 includes desired orientation angles. Still further, the feedback can correspond to desired rates of angular rotation.

In one embodiment, the desired pitch angle is calculated by an additional control loop configured to maintain forward speed. As described in conjunction with FIG. 5, speed and pitch angle are related by the physics of a rolling sphere.

In addition to feedback 895, the controller uses control input 885 from the controller device to implement control on the drive system 890. The control input 885 may originate from a device that utilizes a two-dimensional reference frame (e.g., X and Y). In one implementation, the control input 885 is determined by, for example, processing resources of the self-propelled device 800 that interpret control data from the controller 880 as commands that specify one or more parameters, such as parameters that specify position (e.g., move to a position), distance, velocity or direction. Thus, some embodiments provide that the control input 885 is based on control data that is (i) generated in accordance with a two-dimensional reference frame, and (ii) interpreted as one or more commands that specify parameters such as distance, position or velocity. For example, a desired speed is provided by way of control input 885 to the controller 880. In an embodiment, the controller 880 implements control 888 on the drive system 890 using control parameters 898, which account for the control input 885 and the feedback 895. The control 888 may cause individual components of the drive system 890 to compensate for instability, given, for example, parameters specified in the control input (e.g., command input). In other words, the controller 880 may implement control 888 in a manner that causes the drive system 890 to adjust the motion of the device based on feedback 895, in order to effectively implement the control parameters (e.g., distance to travel) specified in the command input. Furthermore, the control 888 enables the device to maintain control with presence of dynamic instability when the device is in motion.

In some embodiments, the controller 880 is able to determine, from feedback 895, the present state of the self-propelled device 800 in conjunction with desired angles. As mentioned, the controller 880 can use the feedback 895 to implement control parameters, particularly as to compensating for the dynamic instability (see also FIG. 4B) that is inherent in about one or more axes when the self-propelled device is in motion. The errors can be determined for each axis (e.g., pitch, roll and yaw). This uses a technique of feedback where the actual angle is compared to the desired angle, in each axis, to calculate an error or correction signal.

According to embodiments, the controller 880 uses the feedback 895 to establish multiple control loops. In one embodiment, the controller 880 computes an estimated set of state variables, and uses the estimated state variables in a closed loop feedback control. This allows the multiple feedback control loops to be implemented, each of which control or provide feedback as to a state, such as, for example, a position, rate, or angle. The controller 880 can implement feedback control using estimated states, so as to provide for controlled movement of the self-propelled device, both along a surface and in device rotation about axes. The controlled movement can be achieved while the device is inherently unstable during movement.

In addition, incorporating feedback input 895 using sensors and estimation of present state variables enables feedback control 898 for device stability in both static and dynamic conditions. It can be appreciated that actuators in embodiments of a self-propelled device will not respond consistently or cause identical command response, due to disturbances such as variations in actuators, environment, noise and wear. These variations would make stable, controlled movement difficult without feedback control. Feedback control can also provide stability augmentation to a device that can be inherently unstable and allows movement in a controlled and stable manner.

Now the controller has calculated three correction signals and the signals must be combined into command signals to each of the two motors. For reference, the two motors are termed "left" and "right", although it should be understood the assignment of these terms is arbitrary. It can be appreciated that the assignment of labels affects the sign conventions in roll and yaw.

Then, the following equations are used to combine the correction terms into left and right motor commands.

First, the pitch and yaw corrections are combined into intermediate variables. In one embodiment, the pitch correction is limited to prevent the motors from being driven at full speed to create forward motion, which would prevent response to roll or yaw correction inputs.

left_motor_intermediate=pitch correction+yaw correction right_motor_intermediate=pitch correction−yaw correction Next, the roll correction is included appropriately into the left and right motor variables. If the roll correction is positive, roll correction is subtracted from the left motor command:

left_motor_output=left_motor_intermediate−roll_correction right_motor_output=right_motor_intermediate.

Alternatively, if the roll correction is not positive, roll correction is added to the right motor variable:

left_motor_output=left_motor_intermediate right_motor_output=right_motor_intermediate+roll_correction Thus the controller produces an output variable for each motor that includes the desired control in three axes.

In this way, a controller can use a two-dimensional reference frame to provide input for the self-propelled device (which utilizes a three-dimensional reference frame). For example, the controller can implement a graphic user interface to enable the user to input that is based on two-dimensional input. For example, FIG. 11B illustrates a graphic control mechanism that can be implemented on a controller device to enable the user to provide directional input about the X and Y axes (see also FIG. 12A).

Methodology

Figure 9:
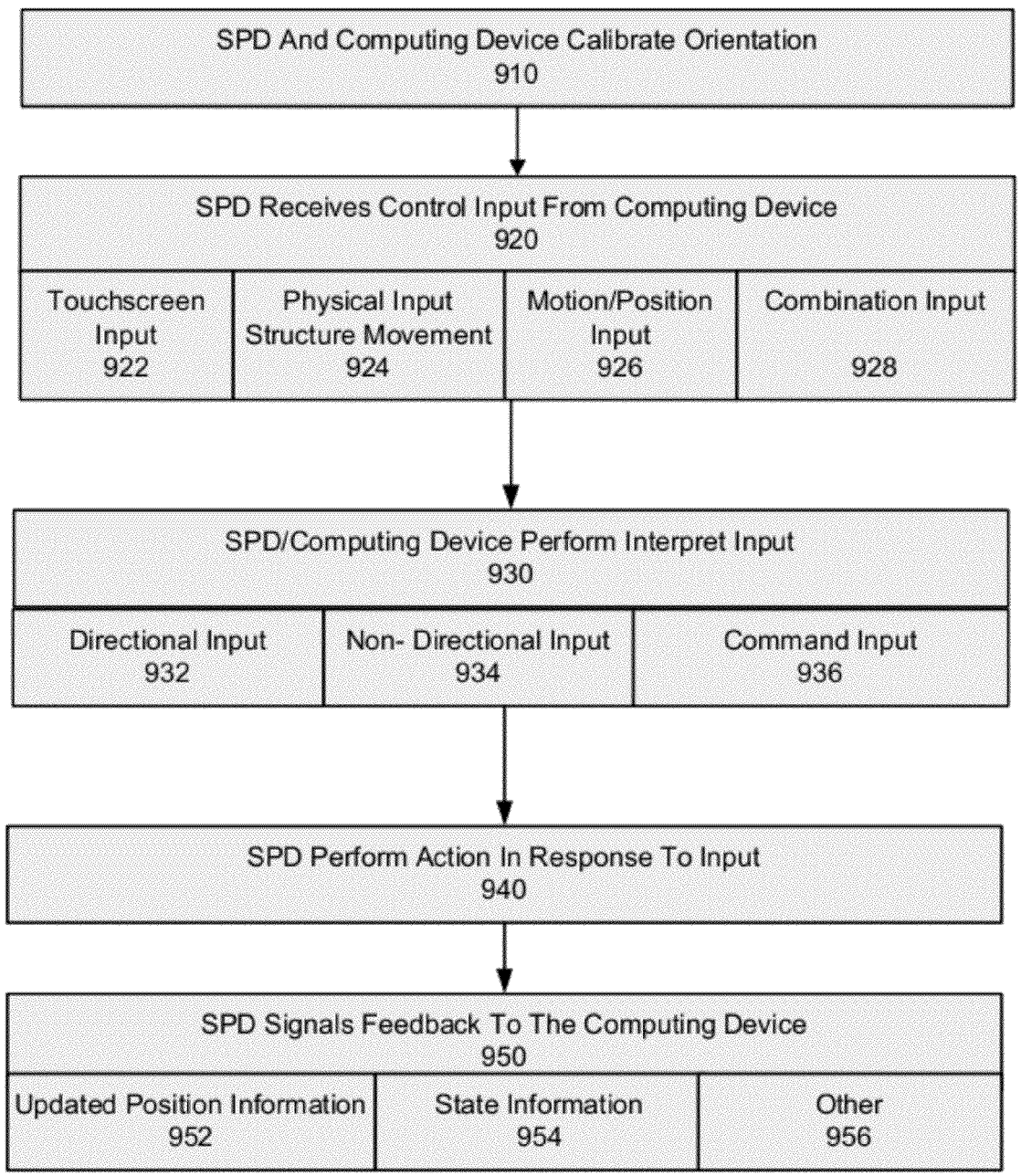
FIG. 9 illustrates a method for operating a self-propelled device using a computing device, according to one or more embodiments.

FIG. 9 illustrates a method for operating a self-propelled device using a computing device, according to one or more embodiments. Reference may be made to numerals of embodiments described with other figures, and with FIG. 7 in particular, for purpose of illustrating suitable components or elements that can be used to perform a step or sub-step being described.

According to an embodiment, when a session is initiated between the self-propelled device 710 and computing device 750 (e.g., self-propelled device is turned on and the self-propelled device program 756 is launched on the computing device 750), the two devices calibrate their respective orientation (910). In one implementation, the self-propelled device 710 obtains its orientation and/or position relative to the initial reference frame, then signals the information to the computing device 750.

In an embodiment in which the self-propelled device 710 is spherical (e.g., a ball), the self-propelled device 710 can base its orientation determination on the location of the device marker. The device marker may correspond to a predetermined feature on the device. The location of the feature relative to an initial reference frame is obtained and communicated to the computing device 750. The computing device 750 may include a user-interface that includes an orientation that is based on the orientation information communicated from the self-propelled device 710. For example, the user interface 760 of computing device 750 may generate a graphic steering mechanism that is calibrated to reflect the orientation of the self-propelled device 710 (e.g., based on the predetermined marker on the self-propelled device 710).

Control input is received on the self-propelled device from the computing device running the self-propelled device program 756 (920). The control input may be in the form of a command, or otherwise be in the form of data that is interpretable on the self-propelled device 710 (through use of programming). The control input may include multiple components, including components from different input or interface mechanisms of the computing device 750 (e.g., touchscreen and accelerometer of the computing device 750). Accordingly, implementations provide for control input to be based on touchscreen input (922), mechanical switch or button inputs (924), device motion or position input (926), or combinations thereof (928). In variations, other forms of input can be entered on the computing device 750 and processed as control input. For example, the computing device 750 may communicate to the self-propelled device 710 one or more of (i) audio input from the user speaking, (ii) image input from the user taking a picture, and/or (iii) GPS input.

In an embodiment, the control input is interpreted on the self-propelled device 710 using programming (930). Thus, the self-propelled device 710 may receive different forms of input from the computing device 750, based on the program executed on the self-propelled device 710 and/or the computing device 750. Moreover, self-propelled device 710 and/or the computing device 750 implement different processes for how input of a given type is to be interpreted. For example, self-propelled device 710 can interpret touchscreen inputs differently for different programs, and the response of the self-propelled device may be determined by which program is executing when the input is received.

In using programming to interpret input, self-propelled device 710 may be capable of different forms of responses to input. Based on the program that is executed on the self-propelled device 710 and/or the computing device 750, the input of the user may be interpreted as directional input (932), non-directional input (934), and/or a multi-component command input (936). More specifically, the device may be correlated to input that is directional in nature by interpreting user actions or input data that includes an inherent directional aspect. For example, a user may operate a graphic steering wheel to control the direction of the self-propelled device 710. The device may also process input non-directionally. For example some forms of user input or action may have inherent directional characteristics (e.g., the user swinging computing device 750 in a particular direction, the user providing some directional input on the steering wheel mechanism that is graphically displayed on the computing device, etc.), but the manner in which the input is processed on the self-propelled device 710 may not be directional, or least directional in a manner that is similar to the inherent directional characteristic of the user action.

In variations, action performed by the user on the computing device 750 may also be interpreted as a command. The input from the user on the computing device 750 may be correlated (either on the computing device 750 or the self-propelled device 710) with instructions that signify an action by the device. The correlation between input and action can be program-specific, and configurable to meet the requirements or objects of the particular program that is being executed. As an example, the self-propelled device 710 can interpret a single user action (e.g., gesture input on computing device) as a command to perform a series of actions, such as actions to perform a combination of movement, state changes, and/or data outputs.

The device performs one or more actions that are responsive to the user action or actions (940). The response of the self-propelled device 710 may be dictated by the program that is executing on the device (as well as the computing device 750) when the control input is received. Thus, the action or actions performed by the self-propelled device 710 may be complex, and multiple actions can be performed based on a single command or series of user actions.

For example, the self-propelled device 710 and the computing device 750 may combine to enable the user in simulating a game in which a ball (such as a tennis ball) is struck against the wall. To simulate the game, the user may swing computing device 750 in a given direction (e.g., like a racquet), causing the self-propelled device 710 to move in a direction that is related to the direction of the user's motion. However, without further input from the user, the self-propelled device 710 may return or move in a substantially opposite direction after the initial movement, so as to simulate the ball striking a wall or another racquet and then returning. Thus, the return of the self-propelled device 710 would be non-directional in its relation to the inherent directional characteristic of the original action.

The same example also illustrates the use of command input, in that one input on the computing device 750 (user swinging device) is interpreted into multiple actions that are taken by the self-propelled device 710. Moreover, based on programming, the self-propelled device 710 and/or the computing device 750 may interpret multiple kinds of user input or action as a command, resulting in performance of one action, or a series of actions. For example, in the ball example described above, the user may also be required to place his finger on the touchscreen of the computing device 750, while swinging the device in a particular direction. The combination of the touchscreen input and the motion input of the computing device 750 can be interpreted as a command for multiple actions to be performed by the self-propelled device 710. In the example provided, the self-propelled device performs the following in response to multi-component user action: determine a velocity and direction based on the user action (e.g., user places finger and touchscreen while swinging computing device 750); move based on the determined velocity and direction; determine when to stop based on the simulated presence of a wall; estimate return velocity and direction; and then move in the return direction.

Additionally, each action or output from the self-propelled device 710 may incorporate several independent sub actions, involving independently operable aspects of the self-propelled device 710. For example, self-propelled device 710 may include multiple motors that comprise the drive assembly. A command input may dictate whether one or both motors are used. Likewise, command input may determine if other hardware resources of the device are used in response to user input. For example, the command input can correlate a user input on the computing device with a series of actions on the self-propelled device 710, which include communicating an output of a magnetometer to the computing device 750.

Other types of command input that can be interpreted from a user action include, for example, altering the state of the self-propelled device 710 based on a particular input from the user. For example, the user may perform a double tap on the touchscreen of the computing device 750 as a form of input. A first program on the self-propelled device 710 may interpret the double tap as a command to spin. A second program on the same self-propelled device 710 may interpret the double tap as a command to illuminate.

In some embodiments, the self-propelled device 710 signals back information (e.g., feedback 718) to the computing device 750 (950). The feedback 718 may correspond to the updated position information (952), information about the device's movement or orientation (e.g., velocity or direction), device state information (954), or other information (956) (e.g., sensor input from the device based on specific programming request). As described with some embodiments, the feedback 718 may be used to generate content on the computing device 750. For example, the feedback 718 may affect a virtual representation of the self-propelled device 710 generated on the computing device 750. With, for example, movement of the self-propelled device 710, the corresponding virtual representation of the self-propelled device on the computing device 750 may also be moved accordingly. Numerous examples are provided herein for user feedback 718 to generate and/or alter content on the computing device 750.

Figure 10:
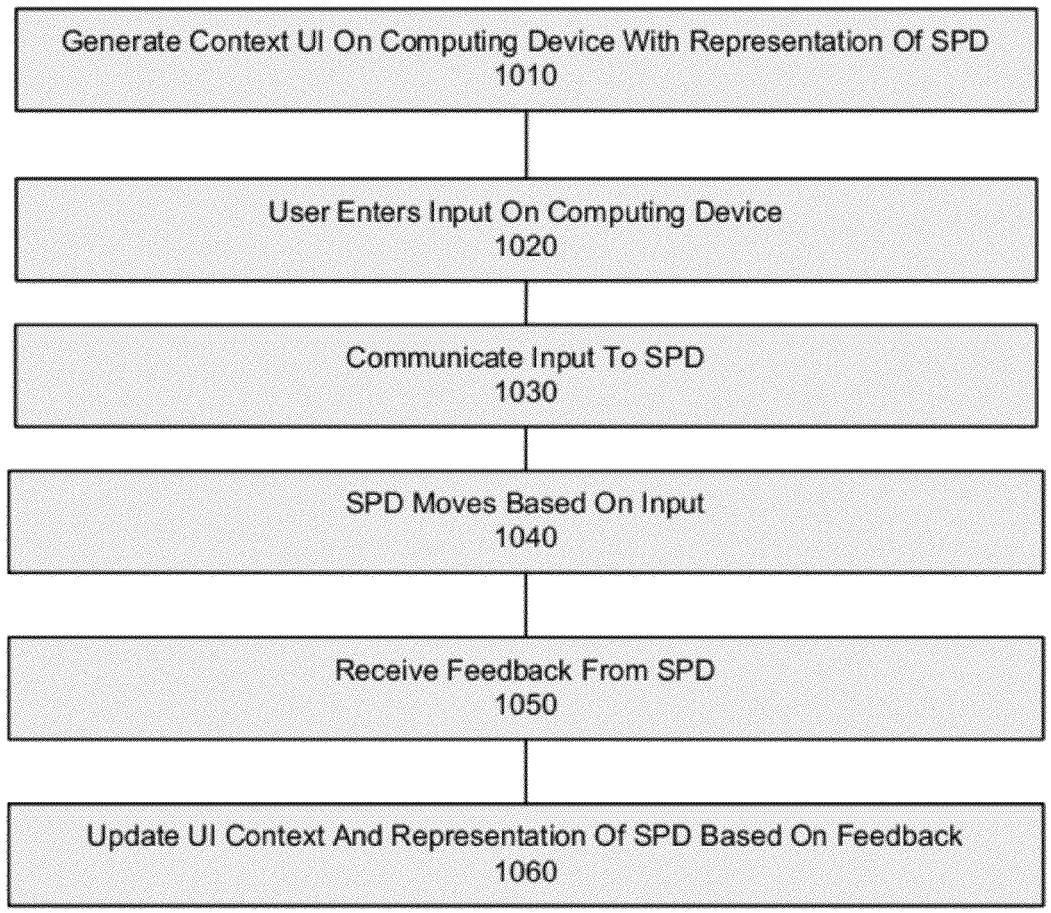
FIG. 10 illustrates a method for operating a computing device in controlling a self-propelled device, according to one or more embodiments.

FIG. 10 illustrates a method for operating a computing device in controlling a self-propelled device, according to one or more embodiments. Reference may be made to numerals of embodiments described with other figures for the purpose of illustrating suitable components or elements for performing a step or sub-step being described.

The computing device 750 may include a contextual user interface (1010). For example, the user interface generated on the computing device 750 may include a graphic interface that provides features for implementing the game or simulation. The features may include use of a graphic object that is virtually moved in accordance with movement of the self-propelled device 710. Specific examples of user interfaces include, for example: (i) a user interface having a circle, and an orientation marker that the user can move about the circle, where the orientation marker represents the orientation of the self-propelled device; (ii) a golfing or bowling interface showing a virtualized ball that represents the self-propelled device; or (iii) a dynamic and interactive gaming content in which an object representing the self-propelled device 710 is moved in the context of gaming or simulation content.

A user may operate the computing device 752 to enter one or more inputs (1020). The input may be either discrete (in time) or continuous. Discrete input may correspond to a specific user action that is completed, and results in the self-propelled device 710 moving and/or performing other actions. Examples of discrete inputs include simulated golf swings or bowling strokes (e.g., where the user swings his handset and the action is interpreted as a golf or bowling ball movement). Continuous input requires the user to be engaged while the self-propelled device moves. Examples of continuous input include the user operating a virtual steering feature or joy stick as a mechanism for controlling the self-propelled device in its movement. As mentioned with some other embodiments, the user input may correspond to multiple actions performed by the user, including actions that include the use of different input interfaces or mechanisms on the computing device 750. For example, the user input can correspond to user actions on the touchscreen display, the user moving the computing device about the gesture, the user interacting with the camera to the computing device, the user providing speech input from a microphone of the computing device, and/or the user operating buttons and/or mechanical switches on the computing device.

The user input is communicated to the self-propelled device (1030). In one embodiment, the computing device 750 interprets the input of the user, and then signals interpreted input to the self-propelled device 710. In variations, the self-propelled device 710 interprets the input of the user, based on data signals received from the computing device 750.

The self-propelled device 710 may respond to the user input, by, for example, moving in a direction and/or in accordance with the velocity specified by the user input (1040). Other actions, such as spinning, performing other movements, changing state of one or more devices, etc. can also be performed, depending on the interpretation of the user input.

The computing device 750 may receive the feedback from the self-propelled device 710 (1050). The nature and occurrence of the feedback may be based on the programmatic configuration of the self-propelled device 710 and the computing device 750. For example, the feedback communicated from the self-propelled device 710 to the computing device 750 may include information that identifies position, orientation and velocity of the self-propelled device, either at a particular instance or over a given duration of time. As an alternative or addition, the feedback may include or state information about the self-propelled device 710, and/or readings from one or more sensors on the self-propelled device. Furthermore, depending on the implementation, the feedback may be communicated either continuously or discretely. In the latter case, for example, the self-propelled device 710 may perform an action, such as moving to a particular position, and then communicate its position and orientation to the computing device 750. Alternatively, the self-propelled device 710 may continuously update the computing device 750 on this orientation and/or position and/or velocity, as well as state other information. Numerous variations are possible, depending on the programmatic configuration of the self-propelled device 710.

In response to receiving the feedback, the computing device 750 updates, modifies or generates new contextual user interfaces that reflects a change in the representation of the self-propelled device (1060). Specifically, once the self-propelled device 710 moves, its representation of the user interface on the computing device 750 may reflect the movement. For example, the contextual user interface of the computing device may reflect the movement of the self-propelled device 710 in a manner that is not video (or at least not solely video), but rather computer-generated (e.g., animated, graphic, etc.). As an addition or alternative, other information communicated with the feedback (e.g., the state of the self-propelled device 710) may also be reflected in the user interface of the computing device 750. For example, if the self-propelled device 710 is illuminated, its virtual representation of the user interface of the computing device 750 may change to reflect that illumination.

FIG. 14A through FIG. 14C, discussed below, provide further examples and extensions of embodiments in which the self-propelled device is represented in a virtual context on the controller device.

User Control Orientation

Figure 11A:
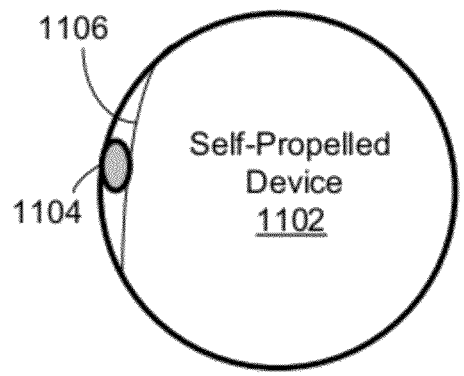
FIG. 11A through FIG. 11C illustrate an embodiment in which a user interface of a controller is oriented to adopt an orientation of a self-propelled device, according to one or more embodiments.
Figure 11B:
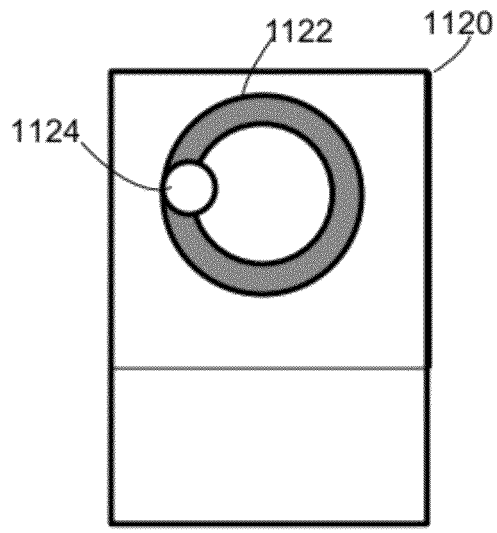
Figure 11C:
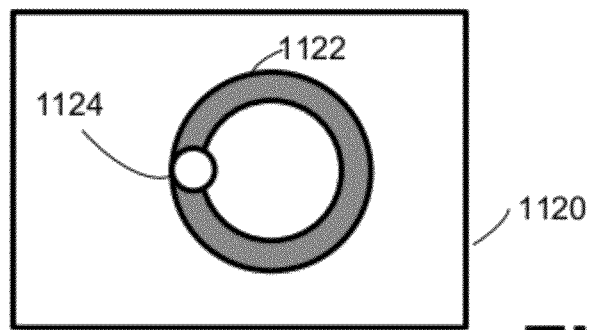

FIG. 11A through FIG. 11C illustrate an embodiment in which a user interface of a controller is oriented to adopt an orientation of a self-propelled device, according to one or more embodiments. In embodiments shown, a self-propelled device 1102 maintains a pre-determined reference frame that indicates, for example, a forward facing direction. With reference to FIG. 11A, the self-propelled device 1102 is shown to be spherical, although other form factors may be adopted (including crafts or vehicles). As a spherical device, however, self-propelled device 1102 is relatively featureless and lacks structure that would otherwise indicate to the observer what the device's frame of reference is, such as what the forward-facing direction of the device is. In order to identify the frame of reference, the self-propelled device 1102 can optionally include an outwardly visible marker 1104 or surface feature that identifies the frame of reference. For example, the marker 1104 can correspond to a light-emitting component that illuminates to mark a forward-facing surface 1106 of the device. The light-emitting component can, for example, correspond to a light emitting diode (LED) that resides with the exterior of the device, or alternatively, within the interior of the device so as to illuminate the forward-facing surface 1106 from within the (e.g., the exterior of the device may be translucent).

The device 1102 can maintain its own frame of reference, using resources that reside on the device. For example, device 1102 may utilize sensors such as a magnetometer (determine north, south, east west), an IMU (see FIG. 8D), a GPS, and/or stored position or state information in order to determine its frame of reference.

FIG. 11B illustrates a controller device 1120 for controlling the self-propelled device 1102. The controller device 1120 includes a display screen 1121 on which a user-interface feature 1122 is provided to enable control of the self-propelled device 1102. The user-interface feature 1122 may enable the user to enter, for example, directional input in order to steer the self-propelled device 1102. According to embodiments, the orientation of the user-interface feature 1122 is calibrated to match the orientation of the self-propelled device 1102, based on the frame of reference maintained on the self-propelled device 1102. For example, the user-interface feature 1122 may include a marker 1124 that serves as a point of contact for interaction with the user. The relative orientation of the marker 1124 on the user-interface feature 1122 may be set to match the orientation of the marker 1104 of the self-propelled device 1102. Thus, in the example provided, the forward-facing orientation of the self-propelled device 1102 may be directed west, and the user may maintain the forward-direction by keeping the marker 1124 in the west direction.

According to embodiments, the orientation of the self-propelled device 1102 with respect to the device's internal frame of reference dictates the orientation of the user-interface 1122 (e.g., the direction of the marker 1124). For example, FIG. 11C can serve as an illustration of the controller 1120 being rotated (e.g., the user moves the controller while holding it) relative to the self-propelled device 1102. The marker 1124 of the user-interface 1122 may be set to the orientation of the marker 1104 on the self-propelled device 1102, so that, for example, the west direction remains forward-facing.

Figure 11D:
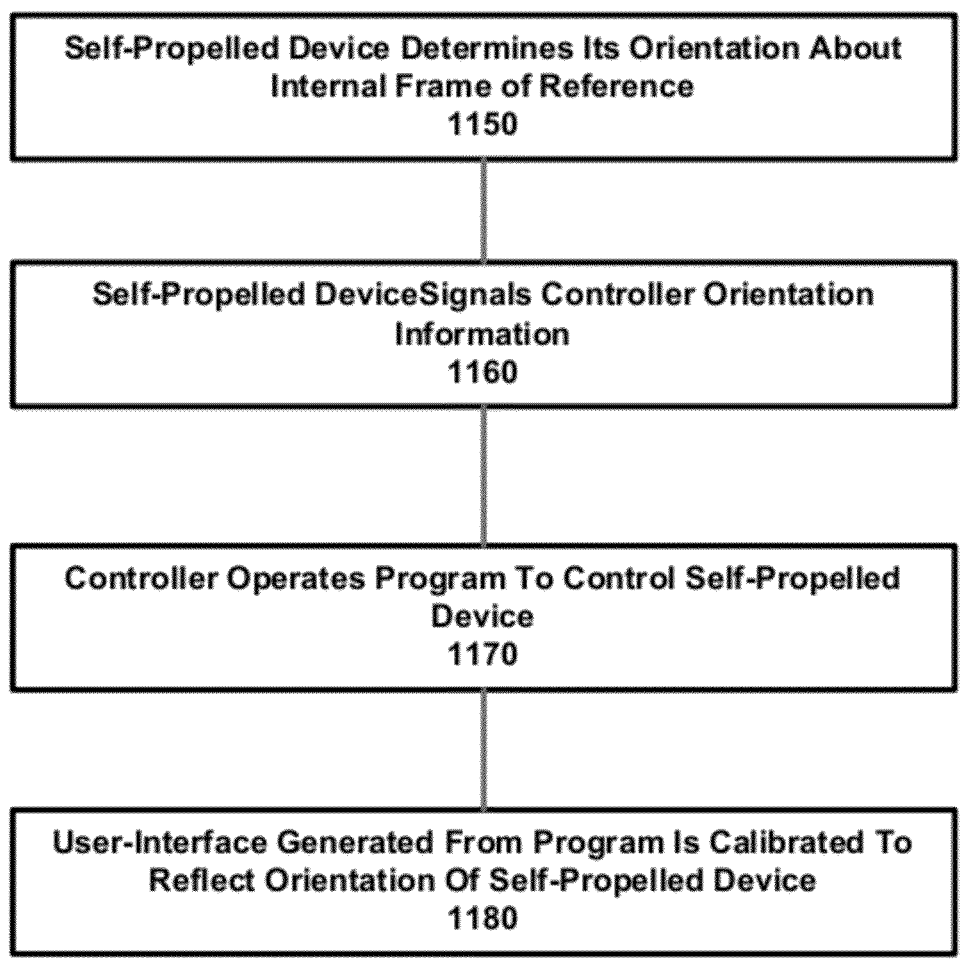
FIG. 11D illustrates a method for calibrating a user-interface for orientation based on an orientation of the self-propelled device, according to an embodiment.

FIG. 11D illustrates a method for calibrating a user-interface for orientation based on an orientation of the self-propelled device, according to an embodiment. While reference is made to elements of FIG. 11A through FIG. 11C for purpose of illustrating suitable elements or components for performing a step or sub-step being described, an embodiment such as described by FIG. 11D may be readily employed with other forms of devices.

The self-propelled device 1102 operates to determine its orientation, relative to an internal frame of reference that is determined from resources of the device (1150). The self-propelled device 1102 can determine its orientation in response to events such as the self-propelled device 1102 (i) being switched on, (ii) being connected wirelessly to the controller device 1120, (iii) after a set duration of time, (iv) after user input or command, and/or (v) after a designated event, such as a bump that makes the device "lost".

The self-propelled device 1102 signals information to the controller 1120 that indicates the orientation of the self-propelled device 1102 relative to the device's frame of reference (1160). The information may be signaled wirelessly through, for example, BLUETOOTH or other forms of wireless communication mediums.

The controller 1120 may initiate a program or application to control the self-propelled device 1102 (1170). For example, a control program may be operated that initiates the controller 1120 in connecting with the self-propelled device 1102. The program may generate a user-interface 1122 that displays content in the form of a virtual controller for the self-propelled device 1102. The virtual controller can include a marker or orientation that indicates front/back as well as left/right.

Based on the information received from the self-propelled device 1102, the controller 1120 configures the user-interface 1122 so that the marker or orientation is aligned or otherwise calibrated with the orientation maintained on the device (1180). For example, as a result of the calibration or alignment, both the self-propelled device 1102 and the controller 1120 recognize the frontal direction to be in the same direction (e.g. north or west).

Numerous variations may be provided to the examples provided. For example, the user-interface 1122 can include alternative steering mechanisms, such as a steering wheel or virtual joystick (see also FIG. 12A). The manner in which the user-interface 1122 can be configured to provide directional input can also be varied, depending on, for example, the virtual model employed with the user-interface (e.g., steering wheel or joystick).

Controller Interface and Usage Scenarios

Figure 12A:
FIG. 12A and FIG. 12B illustrate different interfaces that can be implemented on a controller computing device.
Figure 12B:
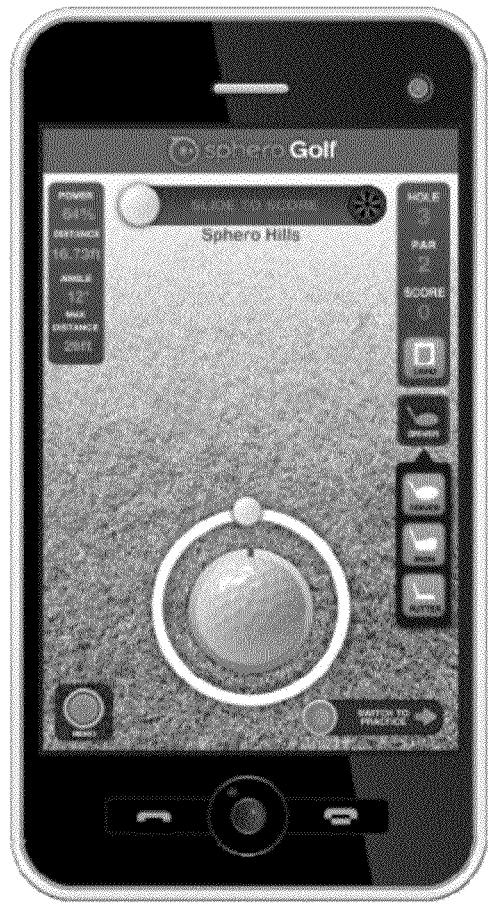

FIG. 12A and FIG. 12B illustrate different interfaces that can be implemented on a controller computing device. In FIG. 12A, content corresponding to a steering mechanism is illustrated to control the velocity and direction of a self-propelled device. In FIG. 12B, content corresponding to a gaming interface (e.g., golf) is depicted that shows a representation of the self-propelled device in the form of a golf ball. The user can interact with the devices shown (e.g., take golf swing with the controller/computing device) to direct the self-propelled device to move. In turn, the content generated on the computing device can be reconfigured or altered. In particular, the representation of the self-propelled device can be affected. For example, the golf ball may be depicted as moving when the self-propelled device moves.

Figure 13A:
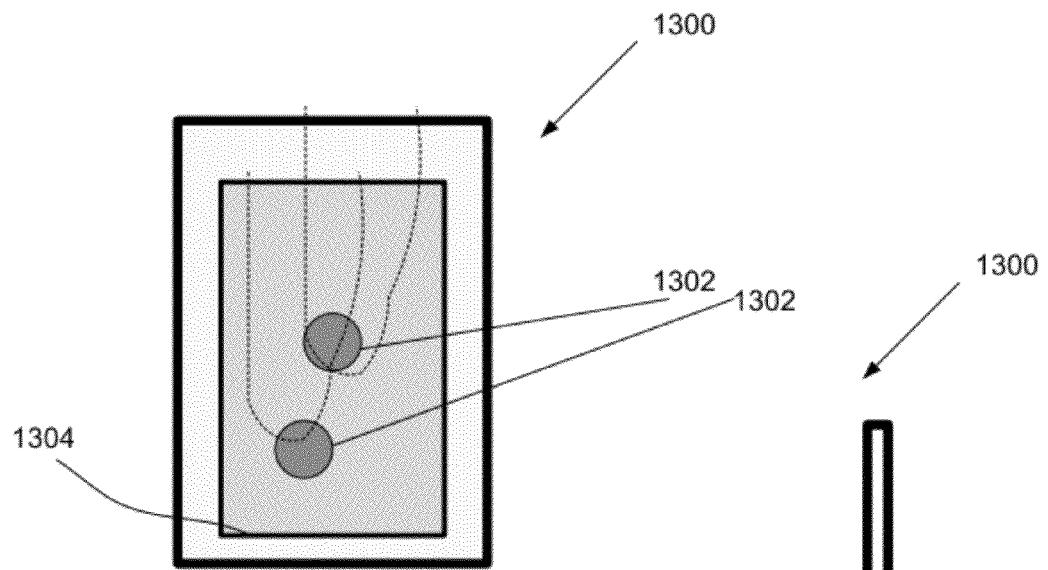
FIG. 13A through FIG. 13C illustrate a variety of inputs that can be entered on a controller computing device to operate a self-propelled device, according to an embodiment.
Figure 13C:
Figure 13B:
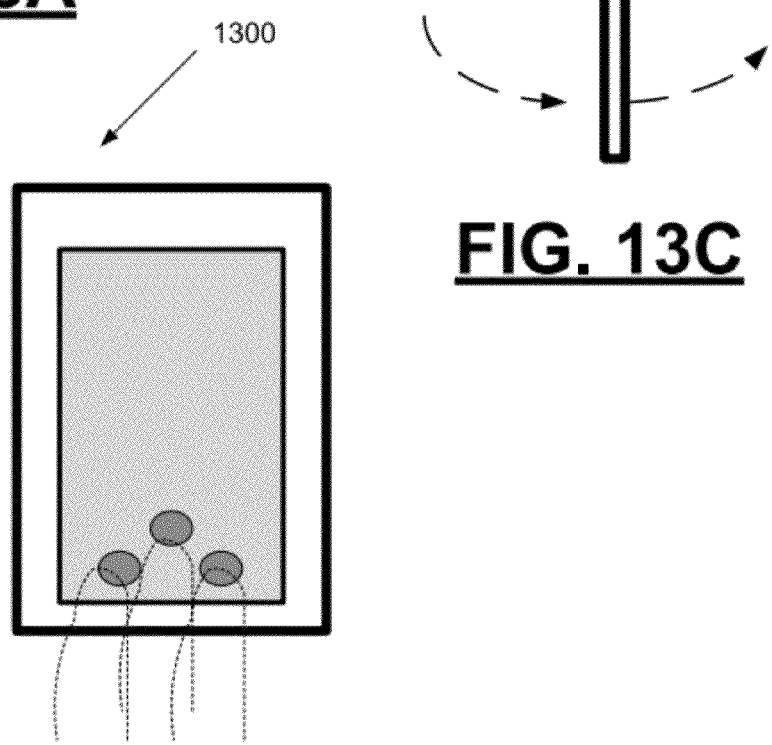

FIG. 13A through FIG. 13C illustrate a variety of inputs that can be entered on a controller computing device to operate a self-propelled device, according to an embodiment. In FIG. 13A and FIG. 13B, the user can be prompted by graphic features 1302 to place fingers on a given area of a display screen 1304. For example, two finger positioning can be used for a golf example, and three finger positioning can be used for a bowling example. With fingers placed, the device 1300 can be moved in an arc motion to simulate a golf stroke or bowler arm motion (FIG. 13C). The examples illustrate cases in which multiple types of input are combined and interpreted as a set of commands with one or more parameters (e.g., parameters dictating direction and velocity or position of the self-propelled device). For example, a guided touch screen input (first type of input) performed concurrently with movement of the controller device (second type of input) in an arc fashion can be interpreted as a command to move the self-propelled device in a given direction for a designated distance (e.g., for golfing or bowling examples).

Virtual Object Representation and Interaction

Some embodiments enable the self-propelled device to be virtually represented on an interface of the controller device. In such embodiments, the degree to which the self-propelled device and its virtual representation are linked may vary, depending on desired functionality and design parameters. For example, in gaming applications, some events that occur to the self-propelled device (e.g., bumps) may be conveyed and represented (e.g., virtual bump) with the device representation.

With reference to FIG. 14A, the self-propelled device 1400 may be operated in a real-world environment, and virtually represented by a graphic object 1412 that is part of the user-interface of the controller device 1402. The implementation may be provided by executing a corresponding program or instruction set on each of the self-propelled device 1400 and controller device 1402 (e.g., a game). Based on the implemented instruction set, a relationship can be established between the self-propelled device 1400 and the virtual representation 1412. The relationship can be established by way of the self-propelled device 1400 signaling state information 1405 to the controller device 1402, and the controller device signaling control information 1415 based on user-input and virtual events.

As described with other embodiments, the self-propelled device 1400 may operate in a three-dimensional reference frame and the controller device 1402 may operate in a two-dimensional reference frame. The self-propelled device 1400 can include a three-dimensional controller that processes two-dimensional control information 1415 (e.g., user input and virtual events) in its three-dimensional reference frame. The three-dimensional environment of the self-propelled device 1400 may be represented two-dimensionally on the controller device 1402.

Examples of the relationships can include: (i) the self-propelled device 1400 communicates its state (e.g., position information) to the controller device 1402, which reflects a corresponding change in the position of the virtual object 1412—for example, both the self-propelled device and the controller device 1402 may trace a similarly shaped path; (ii) the user can enter input that moves or changes position of the virtual representation 1412, and this change is reflected by real-world movement of the self-propelled device 1400; (iii) an event that occurs to the self-propelled device 1400 is conveyed and/or represented in the virtual environment of the virtual representation 1412—for example, the self-propelled device may collide with an object, causing lateral movement or stoppage, and this event may be communicated virtually with the object 1412 being bumped, stopped or even made to change color to reflect the event; and (iv) an event that occurs to the virtual environment of the virtual representation 1412 is conveyed to the self-propelled device—for example, a virtual collision between the virtual representation 1412 and another virtual object (e.g., wall, zombie, etc. in gaming environment) may result in the movement of the virtual object 1412 being changed, and this change may be communicated as control input to the self-propelled device 1402 which can shake, stop or move unexpectedly to simulate the virtual collision). Numerous variations may be implemented with respect to the manner in which the self-propelled device is linked to a virtual environment.

FIG. 14B and FIG. 14C illustrate an application in which a self-propelled device acts as a fiducial marker, according to an embodiment. In the example shown, a gaming environment is provided in which the user can steer the self-propelled device through, for example, tilting or movement of the controller computing device 1430. While the self-propelled device is moved, the controller computing device displays content that includes both virtual objects 1432 and the representation 1434 of the self-propelled device. Based on the rules and object of the game, the user can steer the self-propelled device and cause the virtual representation 1434 to move on the screen in a manner that reflects the real movement of the self-propelled device. As noted in FIG. 14A, events such as collisions between the self-propelled device 1430 and its environment, can be communicated and represented with the virtual representation 1434 and its environment. Likewise, events that occur between the virtual representation 1434 and the virtual environment (e.g., wall or zombie collision) can be communicated and implemented on the self-propelled device 1402 (e.g., the device may veer left).

Figure 15:
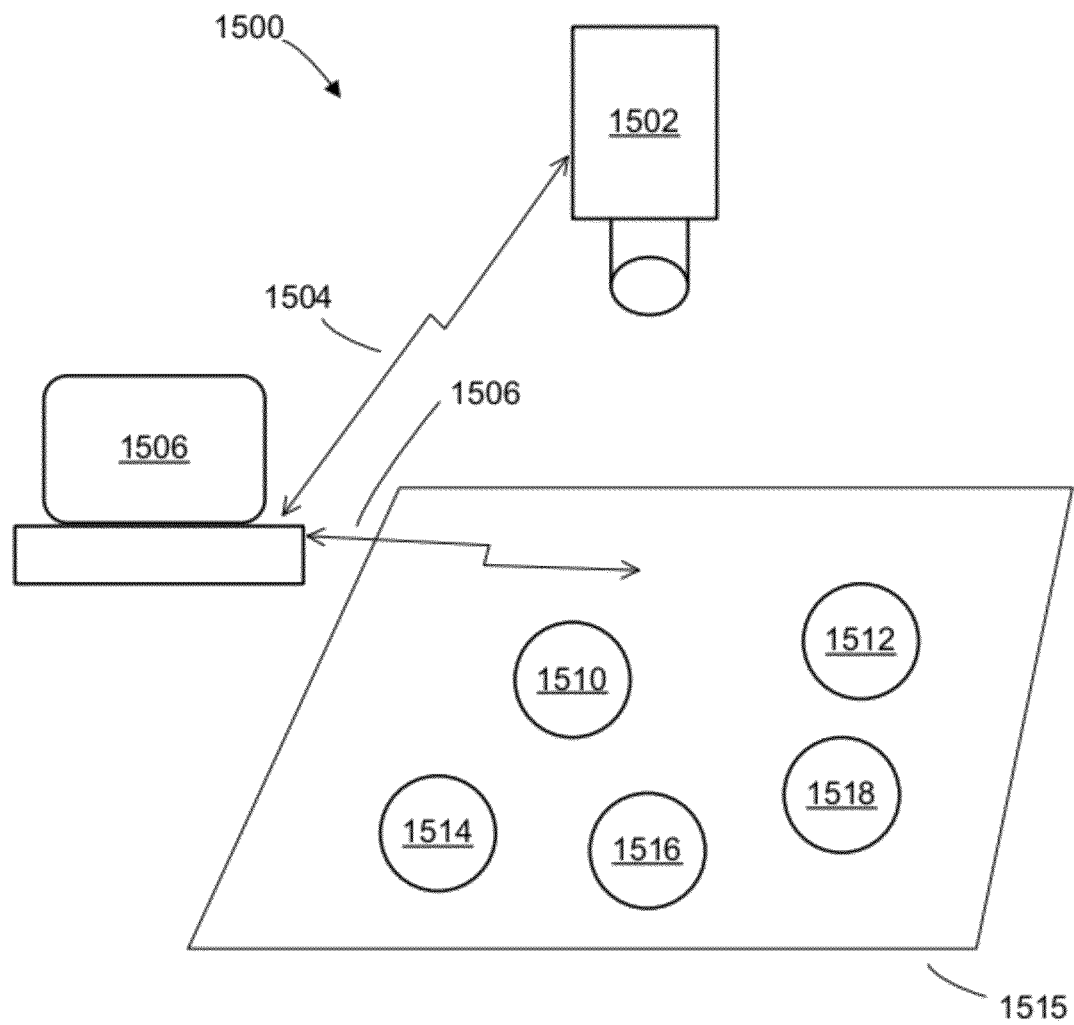
FIG. 15 illustrates an interactive application that can be implemented for use with multiple self-propelled devices, depicted as spherical or robotic balls, under an embodiment.

FIG. 15 illustrates an interactive application that can be implemented for use with multiple self-propelled devices, depicted as spherical or robotic balls, under an embodiment. In FIG. 15, system 1500 creates an ad-hoc network to arrange a number of self-propelled robotic balls into a desired pattern on a planar surface 1515. For example, the balls may be automatically arranged into a character, word, logo, or other meaningful or visually interesting arrangement. Five robotic balls 1510, 1512, 1514, 1516, and 1518 are shown for illustration, but this does not imply any limit to the number of robotic ball devices that can be included.

Video camera 1502 captures images of the robotic balls on surface 1515 and relays the image to computer/controller 1506 using data link 1504. Computer/controller 1506 executes an application designed to identify the robotic balls and instruct each robotic ball in moving to its desired position. Computer controller 1506 forms an ad-hoc network via link 1506 with robotic balls 1510, 1512, 1514, 1516, and 1518 to send instructions to each ball. Link 1506 can, in one embodiment, be a link to a single ball, and each ball is communicated with in turn. In another embodiment, link 1506 connects to two or more of the robotic balls, or is a broadcast channel to all robotic balls.

One task controller 1506 performs is identification of each ball and its location. To perform this task, in one embodiment controller 1506 sequentially instructs each ball to emit a unique signal detectable by camera 1502 in conjunction with controller 1506 and associated application software. The signal may be detectable by a human or not. For example, a ball 1510 emits a certain color or pattern of light. In one embodiment, the ball's light pattern is modulated in a manner detectable by video camera 1502 and controller 1506. In another embodiment, every ball in the array is instructed to simultaneously emit its own unique identification signal or light pattern.

Once every robotic ball on surface 1515 has been identified and located by controller 1506, controller 1506 issues a set of movement instructions to each robotic ball to move it into the desired location.

Figure 16A:
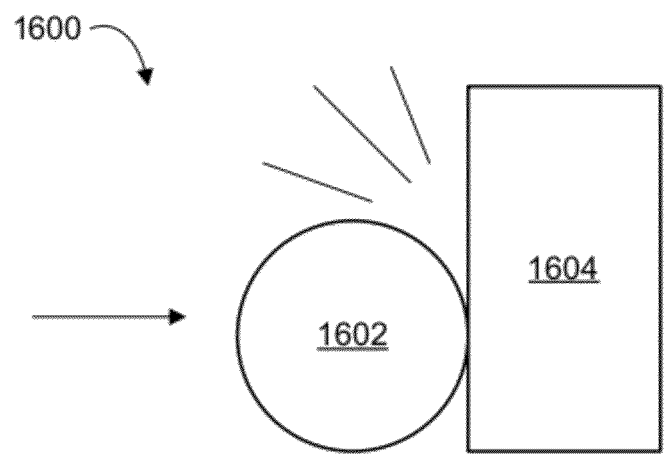
FIGS. 16A and 16B illustrate a method of collision detection, according to an embodiment.
Figure 16B:
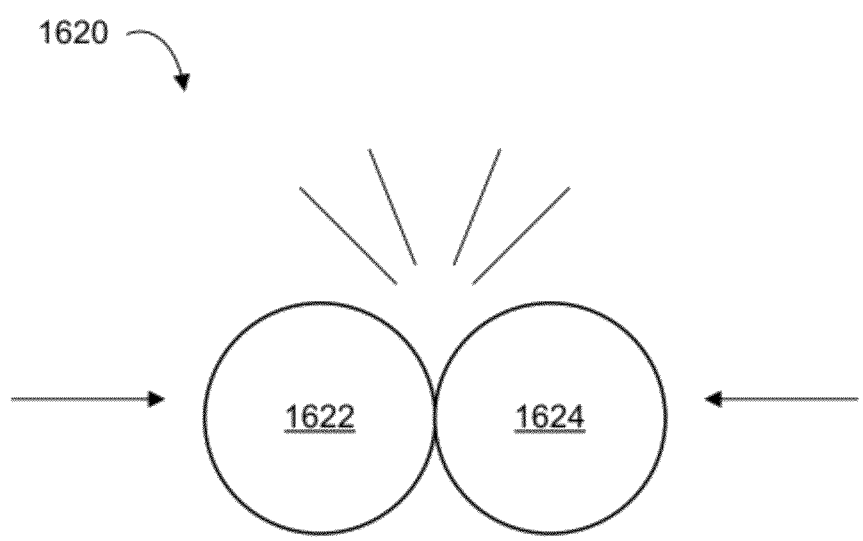

FIGS. 16A and 16B illustrate a method of collision detection, according to an embodiment. In FIG. 16A, collision event 1600 occurs when self-propelled device 1602 collides with fixed object 1604. A collision event causes a sudden negative acceleration in self-propelled device 1602. Device 1602, in one embodiment, is equipped with multi-axis accelerometers for sensing acceleration. The data from the accelerometer sensors show a distinctive pattern indicating a collision event has occurred. In one embodiment, collision detection occurs in onboard processing of device 1602. If self-propelled device 1602 has established a network connection with another device, either a controller or another self-propelled device, then collision detection can occur in any connected device.

FIG. 16B shows a more complex case of a collision event 1620 between two self-propelled devices 1622 and 1624. In the event of a collision between two self-propelled devices, it may be the case that one was in motion or that both were in motion, prior to the collision. Detection of a collision between two self-propelled devices requires that a processor receive data from both devices, and that the data be tagged to allow time-correlation of collision events. If two collision events occur at the nearly the same time in two self-propelled devices, it is inferred that the two devices were involved in a collision event—they collided with each other. Further filtering is possible, for example to determine if the two devices were in close proximity, or if either was moving toward the other at the time the collision event was detected. Filtering increases the probability of accurately detecting a collision event from acceleration data. Collision detection can be useful in games and in applications that require detection of walls and obstacles.

CONCLUSION

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with FIGs below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and personal digital assistants (PDAs)), and magnetic memory. Computers, terminals, network enabled devices (e.g., mobile devices such as cell phones) are all examples of machines and devices that utilize processors, memory and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A computer-implemented method performed by one or more processors of a self-propelled spherical device, the computer-implemented method comprising:
    (a) receiving, from a mobile computing device, motion-sensed inputs corresponding to a set of actions performed by a user of the mobile computing device, the motion-sensed inputs corresponding to the user's manipulation of the mobile computing device through a sensor set that can detect the mobile computing device moving in three-dimensional space, the sensor set including at least an accelerometer;
    (b) interpreting the motion-sensed inputs as a set of commands according to instructions executable by the one or more processors to maneuver the self-propelled spherical device, the executable instructions including motion input instructions specific to interpreting the user's manipulation of the mobile computing device through the sensor set; and
    (c) implementing the set of commands on a drive system of the self-propelled spherical device to maneuver the self-propelled spherical device in accordance with the executable instructions; and
    (d) controlling the self-propelled spherical device.

2. The method of claim 1, wherein the set of actions include at least one action that has an inherent directional characteristic, and wherein (c) includes interpreting the at least one action as a directional command and maneuvering the self-propelled spherical device, based on the directional command, in a manner that is not correlative of the inherent directional characteristic of the at least one action.

3. The method of claim 2, wherein the directional command causes the self-propelled spherical device to maneuver linearly in a first direction that is not correlative of the inherent directional characteristic of the at least one action.

4. The method of claim 2, wherein the directional command causes the self-propelled spherical device to maneuver in multiple directions, including in at least one direction that is not correlative of the inherent directional characteristic of the at least one action.

5. The method of claim 2, wherein the directional command causes the self-propelled spherical device to maneuver in at least one rotational direction that is not correlative of the inherent directional characteristic of the at least one action.

6. The method of claim 1, wherein the executable instructions, when executed, cause the self-propelled spherical device to control a direction, a velocity, a rotational motion, or a path of the self-propelled spherical device.

7. The method of claim 1, wherein the set of actions performed by the user include a touch input that is indicative of a first direction, and wherein (c) includes interpreting the touch input as a directional command and maneuvering the self-propelled spherical device in at least a second direction that is different than the first direction in accordance with the directional command.

8. The method of claim 1, wherein (a) includes receiving a directional motion input corresponding to the user moving the mobile computing device in a manner that is indicative of a first direction, and wherein (c) includes interpreting the directional motion input as a directional command and maneuvering the self-propelled spherical device in at least a second direction that is different than the first direction in accordance with the directional command.

9. The method of claim 1, wherein the set of actions includes a first type of action that is detected by a first mechanism of the mobile computing device, and wherein the user moving the mobile computing device is detected by a second mechanism of the mobile computing device, and wherein the executable instructions include instructions to maneuver the self-propelled spherical device in accordance with the first type of action and the user's manipulation of the mobile computing device through the sensor set.

10. The method of claim 9, wherein the first mechanism corresponds to a first sensor in the sensor set of the mobile computing device, and the second mechanism corresponds to the accelerometer of the mobile computing device.

11. The method of claim 9, wherein the first type of action corresponds to the user touching one or more regions of a surface of the mobile computing device.

12. The method of claim 1, wherein the set of actions includes the user manipulating the mobile computing device through the sensor set while simultaneously performing a second action, and wherein the set of commands includes a command to further maneuver the self-propelled spherical device in accordance with the second action.

13. The method of claim 12, wherein the second action corresponds to the user maintaining a position of one or more fingers on a display screen of the mobile computing device.

14. The method of claim 1, wherein the set of actions includes a prompted action corresponding to a generated user-prompt on a display of the mobile computing device, and wherein the set of commands includes a command to maneuver the self-propelled spherical device at least partially in accordance with the prompted action.

15. The method of claim 14, wherein the generated user prompt specifies the user to position a hand or finger on a specified area of the display.

16. The method of claim 1, wherein the user's manipulation of the mobile computing device through the sensor set corresponds to a simulated golf stroke using the mobile computing device, and wherein the set of commands cause the self-propelled spherical device to maneuver in a manner that simulates a golf ball that is directed by the simulated golf stroke.

17. The method of claim 1, wherein the user's manipulation of the mobile computing device through the sensor set corresponds to a simulated bowling stroke, and wherein the set of commands cause the self-propelled spherical device to maneuver in a manner that simulates a bowling ball that is directed by the simulated bowling stroke.

18. The method of claim 1, wherein the instructions executable by the one or more processors to maneuver the self-propelled spherical device include specified instructions corresponding to the user moving the mobile computing device linearly, in an arc, and rotationally, and wherein execution of the specified instructions causes the self-propelled spherical device to maneuver in accordance with the user moving the mobile computing device linearly, in an arc, and rotationally.

19. A system comprising:
a mobile computing device configured to detect a set of actions performed by a user operating the mobile computing device; and
a self-propelled spherical device in communication with the mobile computing device to:
receive motion sensed inputs corresponding to the set of actions, the motion sensed inputs corresponding to the user's manipulation of the mobile computing device through a sensor set that can detect the mobile computing device moving in three-dimensional space, the sensor set including at least an accelerometer;
interpret the set of actions as a set of commands according to executable instructions for maneuvering the self-propelled spherical device, the executable instructions including motion input instructions specific to interpreting the user's manipulation of the mobile computing device through the sensor set;
implement the set of commands on a drive system of the self-propelled spherical device to maneuver the self-propelled spherical device in accordance with the executable instructions; and
control the self-propelled spherical device.

20. A computer-implemented method performed by one or more processors of a mobile computing device, the computer-implemented method comprising:
(a) detecting a set of actions performed by a user on the mobile computing device, the set of actions including a first action in which the user manipulates the mobile computing device through a sensor set that can detect the mobile computing device moving in three-dimensional space, the sensor set including at least an accelerometer;
(b) interpreting the set of actions as a set of commands according to instructions executable by the mobile computing device for maneuvering the self-propelled spherical device, the executable instructions including motion input instructions specific to interpreting the first action;
(c) transmitting the set of commands to the self-propelled spherical device to cause the self-propelled spherical device to maneuver in accordance with the executable instructions; and
(d) remotely controlling the self-propelled spherical device.

21. The method of claim 20, wherein the first action corresponds to an arc motion, pivot, or linear movement of the mobile computing device by the user.

22. The method of claim 20, wherein the first action corresponds to the user holding the self-propelled spherical device while turning or walking.

* * * * *